(12) United States Patent
Isobe et al.

(10) Patent No.: US 8,321,549 B2
(45) Date of Patent: Nov. 27, 2012

(54) ACTION EXECUTION MANAGEMENT FOR SERVICE CONFIGURATION ITEMS

(75) Inventors: Hirofumi Isobe, Kanagawa-ken (JP); Seiji Kobayashi, Kanagawa-ken (JP); Tadashi Tsumura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/478,423

(22) Filed: Jun. 4, 2009

(65) Prior Publication Data

US 2010/0057780 A1 Mar. 4, 2010

(30) Foreign Application Priority Data

Aug. 26, 2008 (JP) ................................ 2008-217234

(51) Int. Cl.
*G06F 17/30* (2006.01)
*G06F 15/16* (2006.01)
*G06F 15/177* (2006.01)

(52) U.S. Cl. ......... 709/223; 709/220; 717/121; 707/723

(58) Field of Classification Search .......... 709/217–228; 717/121; 707/723
See application file for complete search history.

(56) References Cited

U.S. PATENT DOCUMENTS

| 7,853,675 | B2 * | 12/2010 | Cannon et al. | 709/222 |
| 7,860,983 | B1 * | 12/2010 | Mansfield et al. | 709/227 |
| 2007/0203952 | A1 * | 8/2007 | Baron et al. | 707/200 |

(Continued)

FOREIGN PATENT DOCUMENTS

JP 20089861A A1 1/2008

OTHER PUBLICATIONS

IBM Redbooks Deployment Guide Series, "IBM Tivoli Change and Configuration Management Database Configuration Discovery and Tracking," vol. 1, pp. 41-64, Nov. 2006.
IBM Redpaper (Draft version), "IBM Tivoli Common Data Model: Guide to Best Practices (IBM Form No. REDP-4389-00)," pp. 2-7, Nov. 2007.

(Continued)

*Primary Examiner* — Haresh N Patel
(74) *Attorney, Agent, or Firm* — Nelson and Nelson; Daniel P. Nelson; Alexis V. Nelson

(57) ABSTRACT

A system for managing execution of actions corresponding to service configuration items in accordance with embodiments of the invention may include a discovery section for discovering information regarding a configuration item, and a repository for storing a set of data for each configuration item. The set of data may indicate at least one predetermined attribute of the configuration item, and a relation between the configuration item and other configuration items. An associating section may associate a service configuration item with one or more other configuration items that are objects of actions corresponding to the service configuration item. Finally, a determining section may determine whether execution of an action corresponding to a service configuration item is allowed. Such a determination may be made when a request for an action corresponding to a second configuration item is issued during execution of an action corresponding to a first service configuration item, or when a configuration item that is the object of the action corresponding to the second service configuration item is included in a configuration item that is the object of the action corresponding to the first service configuration item.

18 Claims, 19 Drawing Sheets

U.S. PATENT DOCUMENTS

| | | | |
|---|---|---|---|
| 2007/0294406 A1* | 12/2007 | Suer et al. | 709/226 |
| 2008/0243900 A1* | 10/2008 | Yohanan et al. | 707/102 |
| 2008/0263084 A1* | 10/2008 | Faihe et al. | 707/103 R |
| 2009/0037481 A1* | 2/2009 | Baker | 707/200 |
| 2009/0094695 A1* | 4/2009 | Bansal et al. | 726/21 |
| 2009/0240510 A1* | 9/2009 | Hopkins et al. | 705/1 |
| 2009/0313219 A1* | 12/2009 | Gupta et al. | 707/3 |

* cited by examiner

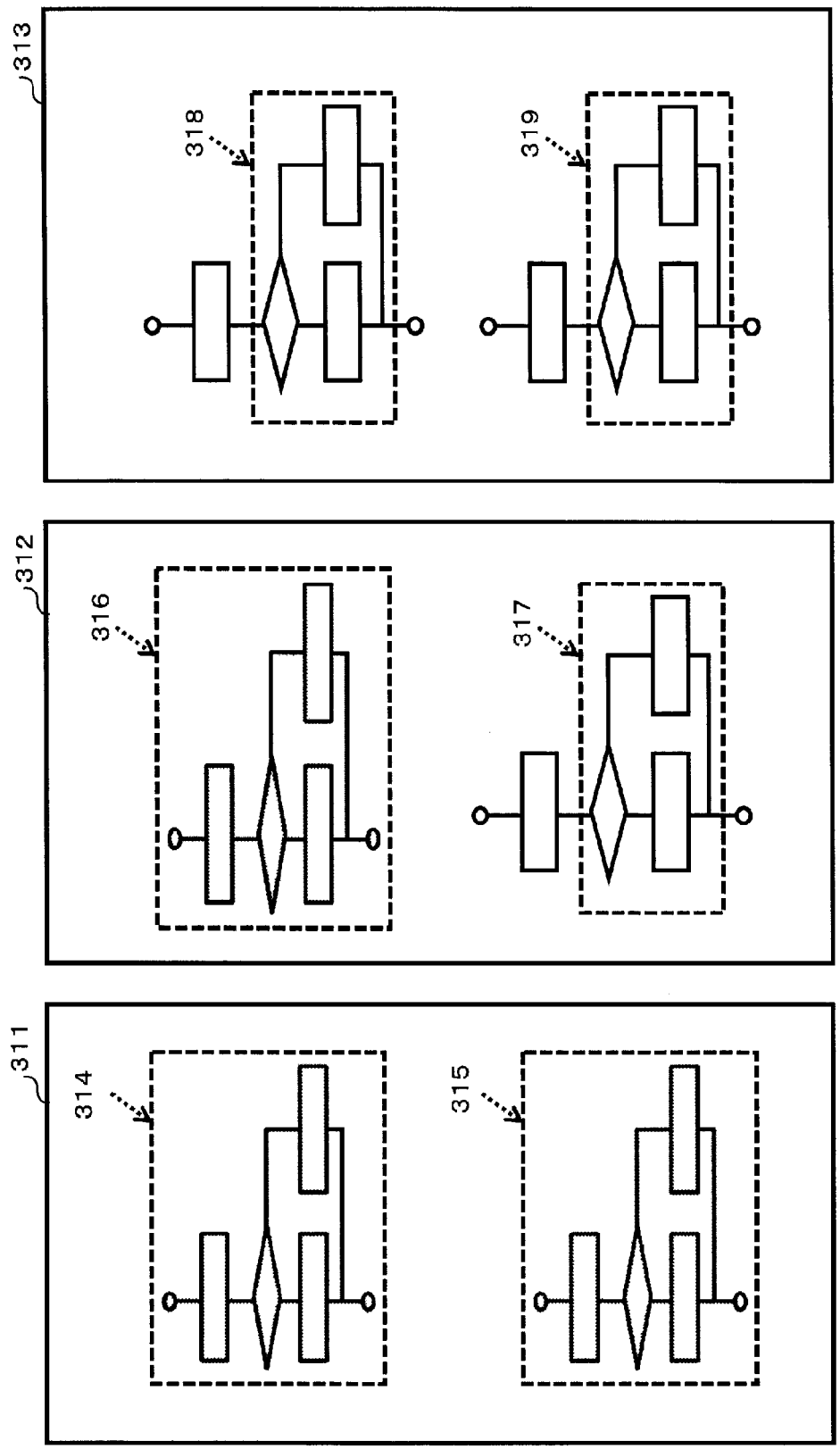

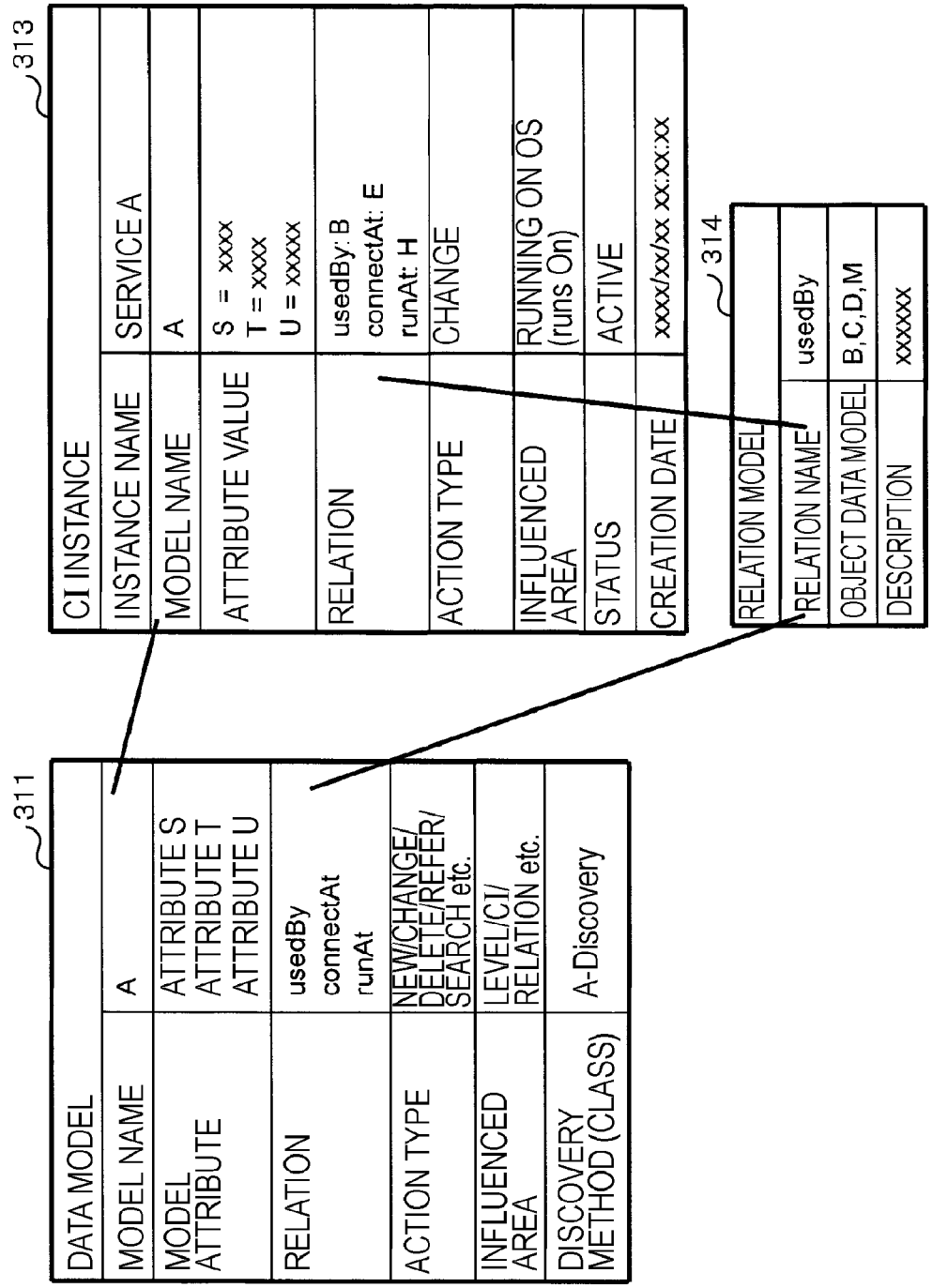

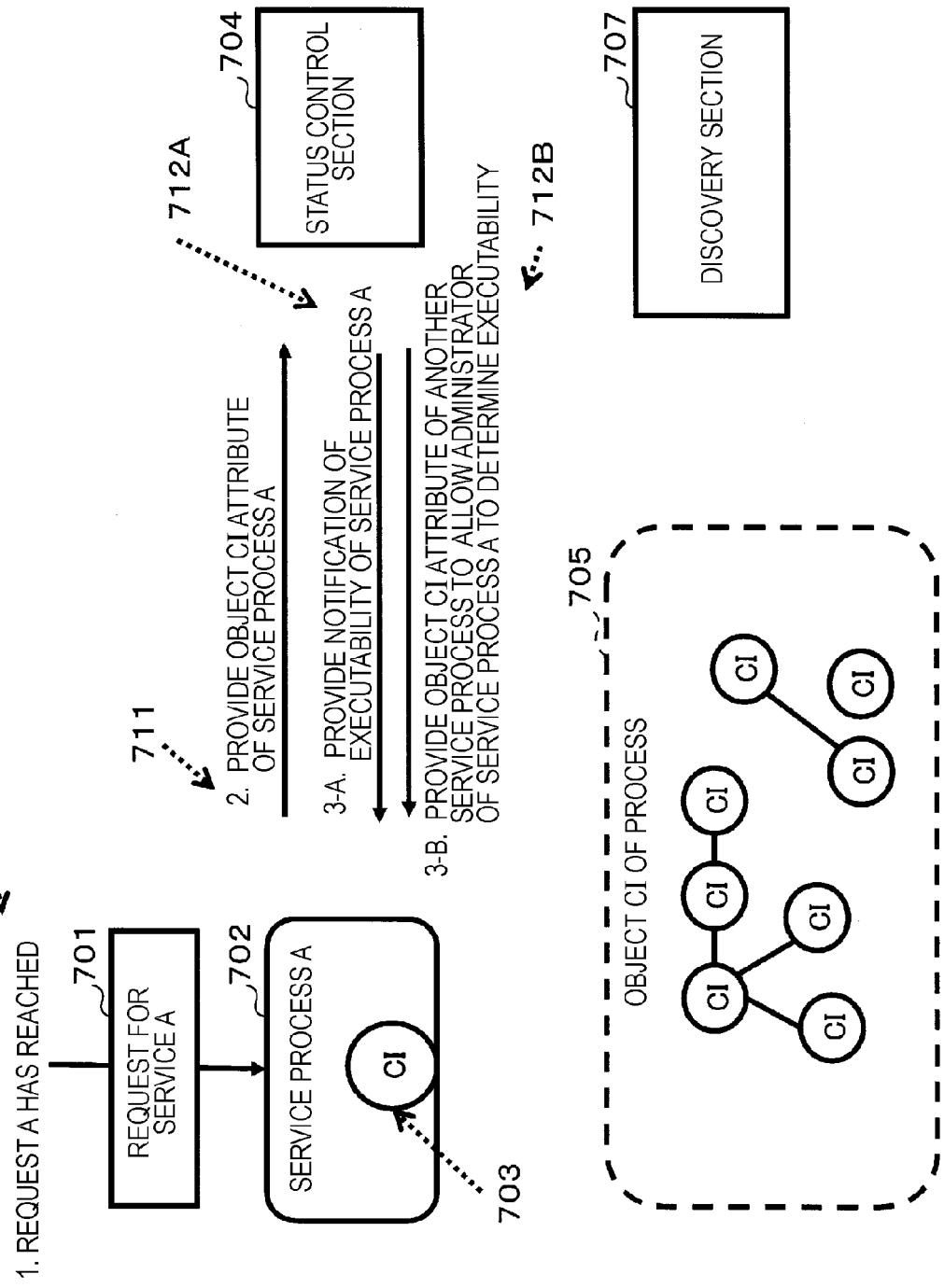

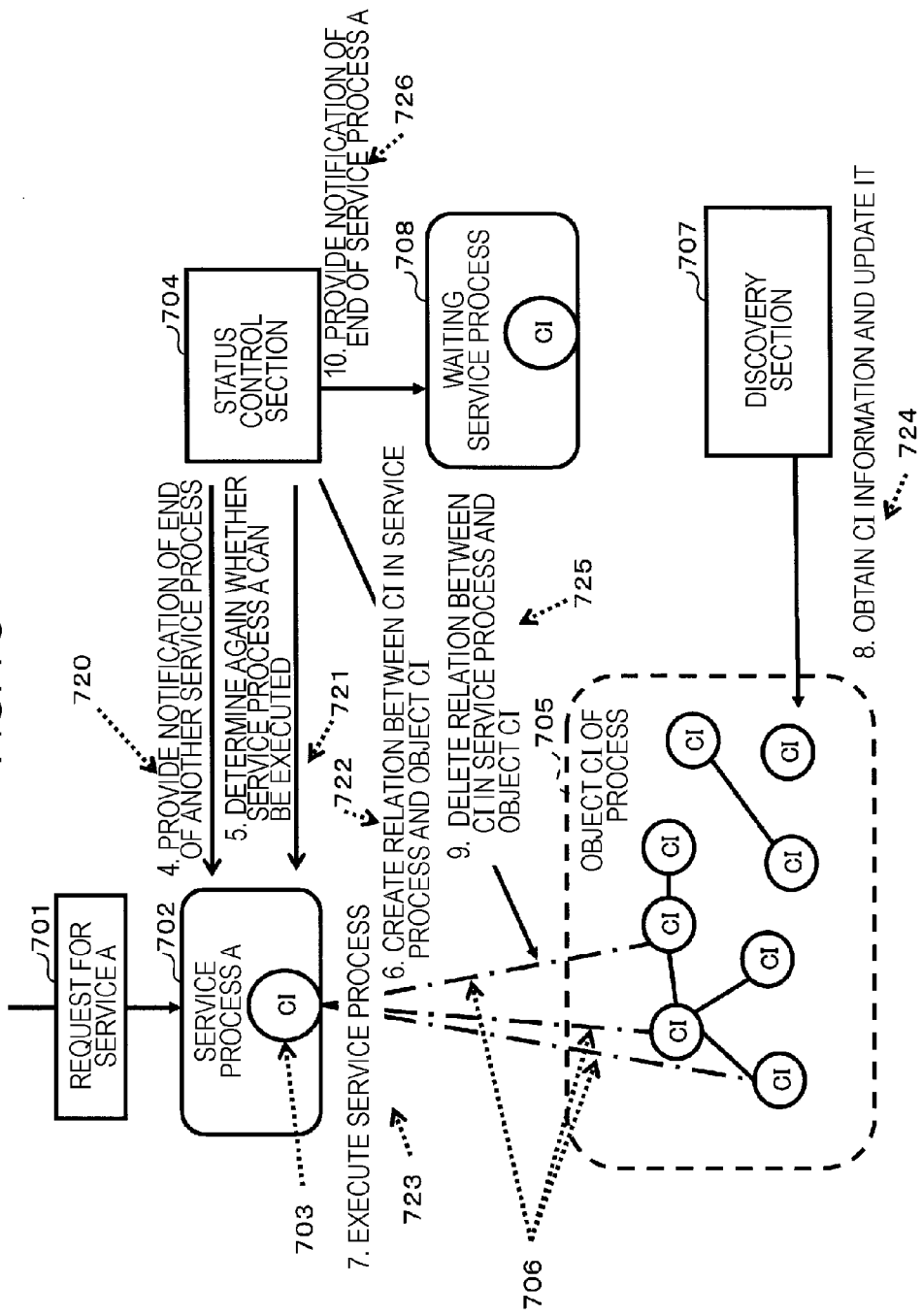

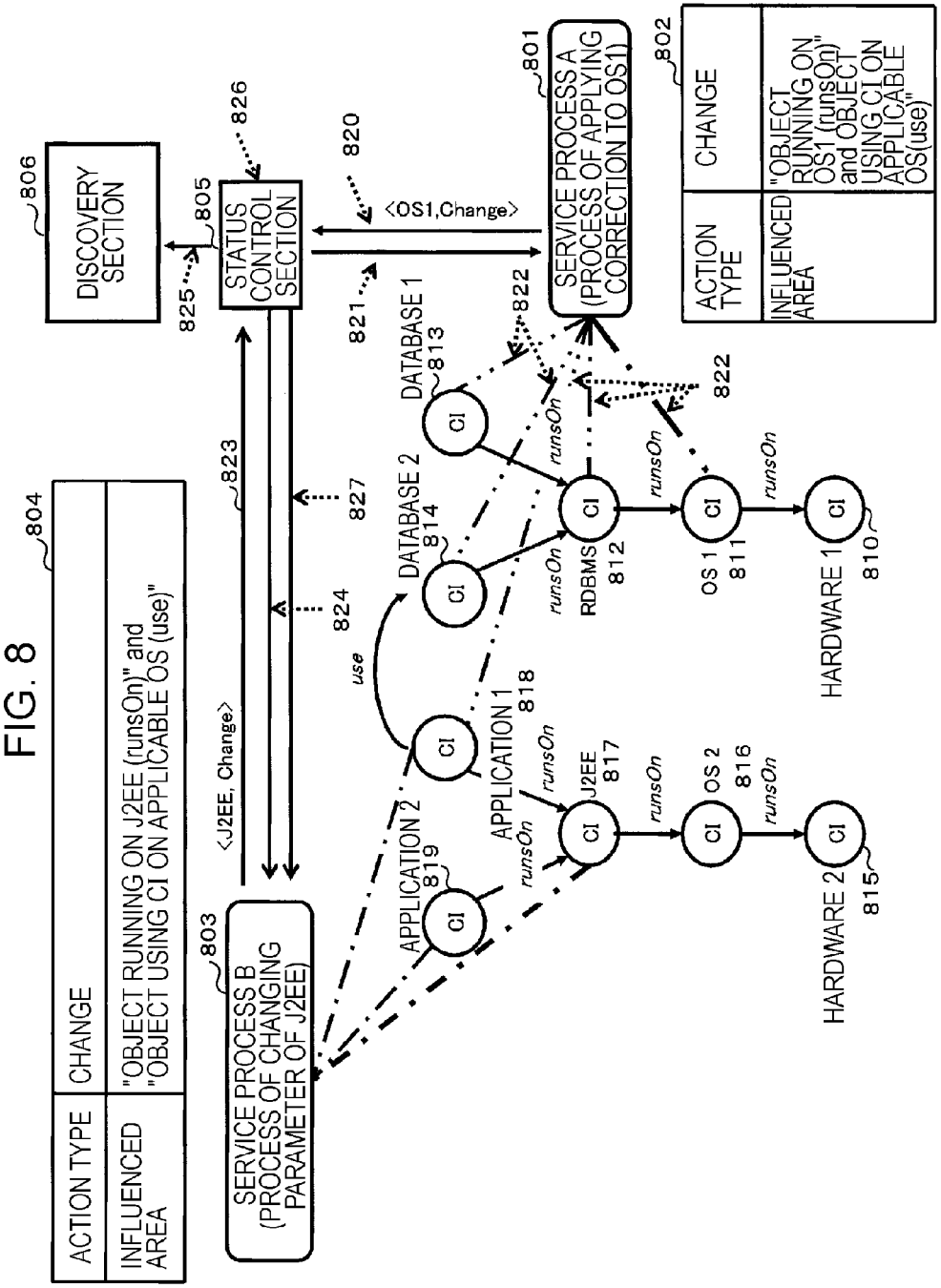

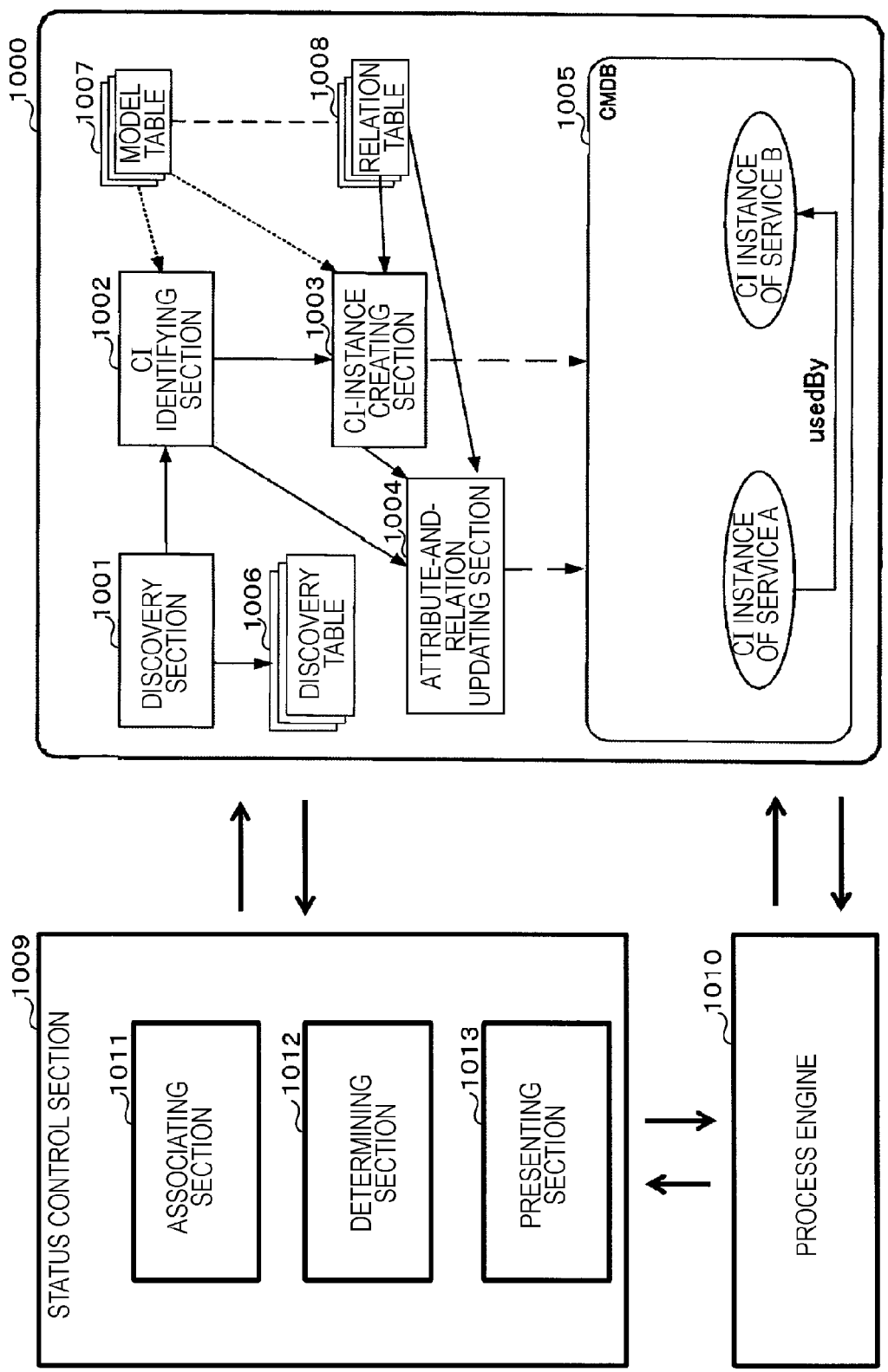

ACTION EXECUTION MANAGEMENT FOR SERVICE CONFIGURATION ITEMS

BACKGROUND

Service management, such as IT service management and business service management, has attracted attention in recent years. The Information Technology Infrastructure Library ("ITIL") gives a detailed description of the best practices for achieving IT service management. The primary functions of the ITIL are service support and service delivery, including configuration management.

Configuration management is a process of recognizing configuration items ("CIs") to be managed by IT service management, and maintaining, updating, checking, and auditing information concerning the configuration items. Configuration items may include system resources, such as hardware and software, facilities necessary for providing IT services, documents such as specifications on IT service management, operation manuals and schematic diagrams, maintenance information services, processes and human resources.

For the ITIL framework, centralized management of the configuration items using a configuration management database ("CMDB") is recommended. The CMDB is a database that stores at least one predetermined attribute of each configuration item and its relations with other configuration items. Key success factors for implementing a CMDB are discovery, or the ability to automatically discover information concerning the CIs, and tracking, or the ability to automatically update such information. It is important that a CMDB accurately reflect CI information, as service processing based on ITIL includes multiple tasks that are organized into operations that refer to CI information in the CMDB.

SUMMARY

Embodiments of the invention have been developed to manage execution for actions corresponding to service configuration items.

In accordance with certain embodiments of the invention, a system for managing execution of an action corresponding to a service configuration item may include a discovery section for discovering information regarding a configuration item and a repository for storing a set of data for each configuration item. The set of data may indicate at least one predetermined attribute of the configuration item and a relation between the configuration item and other configuration items. An associating section may associate a service configuration item with one or more other configuration items that are objects of actions corresponding to the service configuration item. Finally, a determining section may determine whether execution of an action corresponding to a service configuration item is allowed. Such a determination may be made when a request for an action corresponding to a second configuration item is issued during execution of an action corresponding to a first service configuration item, or when a configuration item that is the object of the action corresponding to the second service configuration item is included in a configuration item that is the object of the action corresponding to the first service configuration item.

A corresponding method and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIG. 3B illustrates examples of a combination of service configuration items;

FIG. 3C illustrates a data model, a discovery instance, a CI instance, and a relation model in accordance with an embodiment of the invention;

FIG. 7A is a flowchart (1/3) showing processing an action corresponding to a service configuration item in accordance with an embodiment of the invention;

FIG. 7C is a flowchart (3/3) showing processing an action corresponding to a service configuration item in accordance with an embodiment of the invention;

FIG. 8 depicts an application of software change/release management in accordance with an embodiment of the invention;

FIG. 10 depicts an example of a computer system in accordance with an embodiment of the invention.

DETAILED DESCRIPTION OF THE INVENTION

Figure 1A:
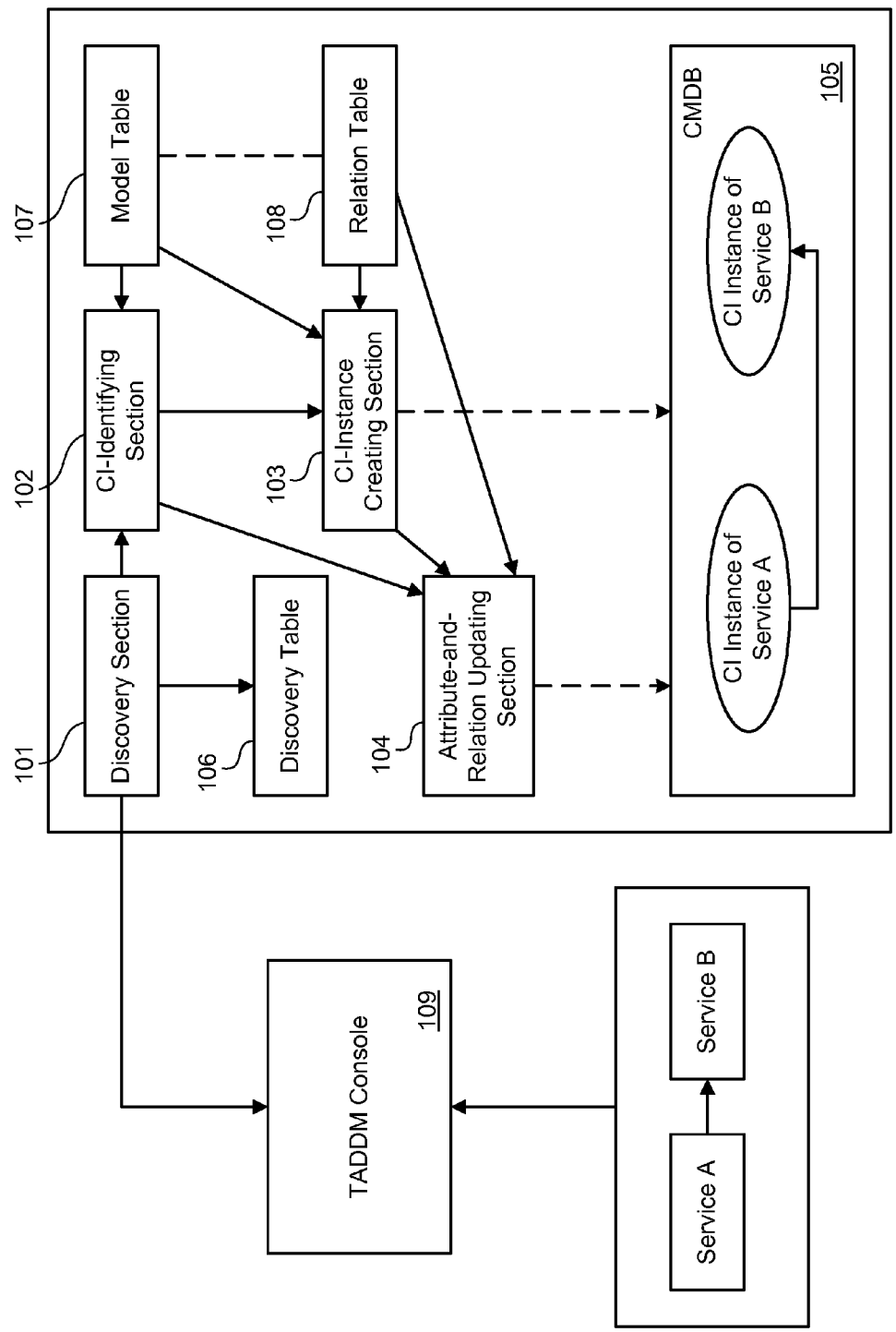
FIG. 1A is a high-level block diagram of an exemplary conventional computer system including a CMDB for managing CIs.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In prior art systems, information on configuration items (hereinafter, "CI information") may be acquired by periodic polling, and an attribute value or the relation value of a CI instance may be updated according to the acquired CI information. As a result, there may be a delay in referring to a CI instance until the CI instance has been updated. Further, in some prior art systems, a user may be required to make a determination as to whether another service process is being executed. This may cause service processing to conflict, resulting in system failure. Thus, conventional service management may not track the dependency relation between service processes, and so may not execute efficient and safe service processing.

In embodiments of the present invention, on the other hand, information on service configuration items being executed (for example, a service process or service step) may be referred to upon instigation of a service configuration item action. This may prevent a conflict of configuration items used by the actions. Moreover, this may allow certain service configuration item actions to be executed substantially simultaneously, thereby substantially eliminating a wait time.

Basic terms used herein are described below.

In certain embodiments, a repository may store at least one set of data. This set of data may indicate at least one predetermined attribute of a configuration item and relations with other configuration items. The set of data may include, for example, data indicating at least one predetermined attribute of a software configuration item and relations between the software configuration item and other software or hardware configuration items. One example of the repository may include a CMDB. A configuration item and relations between the configuration item and other configuration items may be implemented, for example, as an instance of static data, or an instance of a Java® class instance. One embodiment of a repository may include a CMDB recording section storing a CMDB.

International Business Machines Corporation ("IBM") provides Tivoli Change and Configuration Management Database ("Tivoli CCMDB") as software for supporting CMDB construction and controlling operation processes on the basis of the CMDB. Tivoli CCMDB also contains operation management software for executing discovery and tracking.

Particularly, Tivoli CCMDB allows identification of numerous configuration items on a distributed network environment, such as a server, clients, an operating system ("OS"), middle ware (e.g., Web, AP, DBMS, and LDAP), package software, management tools, network devices, and storage devices. Tivoli CCMDB further allows automated discovery and update of information concerning the configuration items, such as information about the structure of computers, information about applications operated on the computers, and configuration information about network attached storages ("NASs") connected to computers, and storage area networks ("SANs") connected directly to the network.

A method for collecting information concerning the configuration items depends on the object to be managed. In principal, a computer system that manages the CMDB may regularly access a managing remote interface to read set files or configuration information on the OS (using Secure Shell ("SSH") or the like) or to execute setting confirmation commands.

Information discovered and updated in the above manner may be arranged into sections (categories, such as computer system, database, application and process), classes (the base unit of a data model, belonging to one or more sections), attributes (attribute information of data, belonging to one class), interfaces (a group with an attribute with high frequency in use, belonging to two or more sections), relations, and data (data type) on the basis of a data model for a configuration management database, such as IBM Common Data Model ("CDM").

Information on the relations between configuration items may be delivered to, for example, Tivoli Application Dependency Discovery Manager ("TADDM") console. Thus, the configuration item and the relations between configuration items may be displayed visually using individual blocks and links between the blocks.

Configuration Item ("CI")

As used herein, the term "configuration item" or "CI" refers to data corresponding to a configuration item belonging to an object area of IT service management, and is a base unit to be managed as the object of IT service management. Examples of CIs include hardware and software system resources, facilities necessary for providing IT services, documents such as specifications on IT service operations, operation manuals, schematic diagrams, services such as hardware or software maintenance works, processes, and human resources. Various types of CI may be managed using CMDBs. Each CI may be represented on a CMDB as an instance of a data model.

Configuration Management Database ("CMDB")

As used herein, the term "configuration management database" or "CMDB" refers to a database that integrally stores and manages information related to all components of an information system. A CMDB may store at least one predetermined attribute of each CI and relations with other CIs. The CMDB may help an organization understand the relations between these components and manage their configurations, and is a fundamental component of the ITIL framework's configuration management process. While the CMDB is conceptually a database, it may physically take the form of a spreadsheet or spreadsheet software. The CMDB may facilitate an administrator's ability to understand relations between CIs.

Configuration Item Instance ("CI Instance")

As used herein, the term "configuration item instance" or "CI instance" refers to data corresponding to a CI. Each CI instance may be represented on a CMDB as an instance of a data model. An example of the instance may include an instance of static data, or a Java® class instance. A Java® class instance may be stored in a CMDB by, for example, a Java® data objects system ("JDO") for achieving the persistence of a Java® class instance and storing it in a hard disk. Accordingly, the created Java® class instance may not be lost even if the power of a computer system is temporarily turned off. When power is restored, the instance may be read from a storage unit, such as a hard disk, and developed on the main memory into a Java® class instance that can be changed or deleted by a Java® class program.

Data Model

As used herein, the term "data model" refers to a schema for defining a CI, and an information model that provides a consistent definition of CIs to be managed, as well as relations between the CIs. Specifically, the data model may define a predetermined attribute of a CI and relation between the CI and other CIs (e.g., production equipment, processes, etc.) An example of the data model may include a data model for a configuration management database proposed by IBM known as a "Common Data Model" or "CDM." The CDM may be implemented using, for example, Unified Modeling Language ("UML").

Attribute

As used herein, the term "attribute" refers to a descriptor to specify and describe individual CIs in CI management. Examples of attributes may include the name of a CI (e.g., a server, client, or firewall), product number (a number for individually identifying a specific entity of the CI, such as a production number or serial number), category (classification of the CI, for example, hardware, software, or document), type (detailed classification of the category), type number (model number of the CI named by a provider), warranty period (provided by a CI provider), version number (of the CI), location (location of the CI, for example, a location where a PC is installed, an archive of software, a storage location of media, or a site that provides services), a person in charge (name of a CI administrator), responsibility start date (date on which the owner administrator took charge of the CI), provider (developer or provider of the CI), license (license number or the number of licenses), provision date (date on which the CI was provided to an organization), acceptance date (date on which the CI was accepted by the organization), use start date (date on which use of the CI was started), CI status (present status, for example, in operation, in testing, or in failure, or future status, for example, an intended CI status), and status of a CI instance (valid or invalid).

Relation

As used herein, the term "relation" refers to a relation between CIs. Relation can be defined by a data mode, like CIs. Examples of the relation are assigns, canConnect, canUse, connectAt, connects, controls, deployedOn, Located, Managed, Owned, provides, runAt, uses, and usedBy. Definition of relations necessary for IT service management will be continued.

A configuration item may include a hardware configuration item, a software configuration item, and/or a service configuration item. In embodiments of the invention, a computer system for managing execution of actions corresponding to service configuration items may manage a single or multiple systems having such configuration items. Multiple systems may be connected together by wire or radio over a network. The service configuration item may include, for example, a service process, multiple service processes, a service step, or multiple service steps.

As used herein, the term "action" refers to a process performed on at least one configuration item that is the object of a service configuration item action. The term "action type" refers to the type of process performed on a configuration item that is the object of an action. Examples of an action type include "new," "change," "delete," "refer," and "search," among others. For example, the action type "new" may indicate a process of adding data to a database when a configuration item that is the object of an action is a database. The action type "change" may indicate a process of updating data in a database when a configuration item that is the object of an action is a database. The action type "delete" may indicate a process of deleting data in a database when a configuration item that is the object of an action is a database. The action type "refer" may indicate a process of referring to data in a database when a configuration item that is the object of an action is a database. The action type "search" may indicate a process of searching for data in a database according to a query when a configuration item that is the object of an action is a database.

When the action type is "new," "change," or "delete," the attribute value of an object configuration item may change. When the changed attribute value is shared by multiple service configuration items, the attribute values among the service configuration items may change depending on the order of execution of the services.

On the other hand, when the action type is "refer" or "search," the attribute value of an object configuration item may not change. Accordingly, even if the changed attribute value is shared by multiple service configuration items, the results of execution of the services may not change, irrespective of the order of execution of the services.

As used herein, the phrase "the object of an action corresponding to a service configuration item" refers to a configuration item that is influenced by execution of an action corresponding to the service configuration item. In embodiments of the invention, the object influenced may be specified by the area of influence of the action. The area may be set as an object CI attribute by an area defined by a data model or by a user. In some embodiments, as shown in FIG. 1A, data models may be stored in a model table. The area may be expressed by, for example, a level indicative of a distance from a node, the model name of a CI instance, an expression using a relation, or the like. The area may also be dynamically determined by a policy used to specify an object area of an action corresponding to a service configuration item (hereinafter referred to as an "object-area specifying policy").

When a service configuration item is expressed as a parent node (0 node), a level indicative of the distance from a node may be expressed as set forth below. A configuration item that has a relation of 1 node with the service configuration item, for example, may be expressed as level 0. A configuration item that has a relation of 1 node with the configuration item of level 0 may be expressed as level 1. A configuration item that has a relation of 1 node with the configuration item of level 1 may be expressed as level 2. Likewise, a configuration item that has a relation of n node with the configuration item of level 1 may be expressed as level (n+1).

Alternatively, when a service configuration item is expressed as a node, a level indicative of the distance from a node may be expressed as follows. A configuration item that has a relation with the service configuration item, for example, may be expressed as level 0. A configuration item that has a relation with the configuration item of level 0 may be expressed as level 1. A configuration item that has a relation with the configuration item of level 1 may be expressed as level 2. Likewise, a configuration item that has a relation with the configuration item of level n may be expressed as level (n+1).

For example, when an action configuration item corresponding to a node is an application for updating a database, a configuration item corresponding to the database may be level 0. An OS in which the database is installed may be level 1. A computer in which the OS is installed may be level 2. The above relations may also be specified by the relations between configuration items, such as runsOn and use.

As used herein, the term "model name of a CI instance" may refer to a model name indicative of a data model with which an instance defined by a CI instance is generated. Alternatively, an "instance name" may specify the CI of a CI instance.

The term "expression using a relation" may refer to a relation between configuration items, such as runsOn and use, or the like. This example shows that a configuration item that uses a configuration item action running on a service configuration item action may be influenced by execution of the service configuration item action.

The term "object-area specifying policy" may refer to a policy used to determine a configuration item related to a service configuration item. The object-area specifying policy may use at least one of an attribute of a configuration item, in particular, a service configuration item, a software configuration item, and a hardware configuration item, and relations between those configuration items.

As used herein, the term "executability determination policy" or "policy that defines rules for determining executability" refers to data that defines operation rules when a configuration item is shared by a plurality of services. For example, the executability determination policy may include operation of an action corresponding to a preceding service configuration item (hereinafter referred to as a "preceding process"), and an action corresponding to a following service configuration item (hereinafter referred to as a "following process").

In some embodiments, a status control section may determine, using the executability determination policy, whether an action corresponding to a service configuration item may be executed. The status control section, for example, may manage the object CI attributes of a service configuration item being executed. The object CI attributes may identify a CI that is the object of an action corresponding to a service process.

Referring now to FIG. 1A, a conventional computer system 100 may include a CMDB for managing CIs. Specifically, FIG. 1A shows a service A and a service B as examples of CIs.

The computer system 100 may include a discovery section 101, a CI-identifying section 102, a CI-instance creating section 103, an attribute-and-relation updating section 104, and a CMDB 105. The discovery section 101, the CI-identifying section 102, the CI-instance creating section 103, and the attribute-and-relation updating section 104 may be installed on a single computer or distributed on a plurality of computers. The computer system 100 may further include a discovery table 106, a model table 107, and a relation table 108. These tables may also be installed on a single computer or distributed on a plurality of computers.

FIG. 1A also shows an example of a TADDM console screen 109. The screen 109 may show CIs and connections between the CIs. The CIs and the connections between the CIs displayed on the screen 109 are merely provided as an example, and do not show all the CIs and connections between the CIs to be managed by the computer system 100.

In some embodiments, the computer system 100 may independently manage configuration items to be managed. The management objects may include configuration items that the computer system 100 can discover.

The discovery section 101 may execute detection (also referred to as "discovery") of information on the CIs, which are the objects to be managed by the CMDB. Some of the CIs may be displayed on the TADDM console screen 109. In some embodiments, the computer system 100 may include a plurality of discovery sections 101.

In certain embodiments, the objects to be managed may be connected to the computer system 100 via a network. The network may be a cable-connection type or a wireless-connection type. The administrator of the computer system 100 may freely set an object to be discovered. The range of discovery may be indicated by, for example, a domain name, an IP address, a MAC address, a device identifier, a database name, or a combination thereof.

If the CI to be managed is a device or a service, information on the device or service may be discovered. The discovered information may be information on a new CI, an updated attribute value, or a relation value of an existent CI. The new CI may be a CI discovered by the discovery section 101 that has not been registered in the CMDB 105. The existent CI may be a CI whose instance has already been registered in the CMDB 105.

The discovery section 101 may discover CI information according to discovery data 202 (for example, A-Discovery in FIG. 2B) stored in the discovery table 106. The discovery data 202 to be used may be specified by a discovery method in a data model 201, as shown in FIG. 2B. The discovery section 101 may pass the discovered CI information to the CI-identifying section 102.

The CI-identifying section 102 may receive the CI information from the discovery section 101 and process the discovery result. The CI-identifying section 102 may determine, with reference to the CMDB 105, whether the CI information is information on a new CI or an updated attribute or relation value of an existent CI. This determination may be executed, for example, by comparing the instance names of the CIs stored in the CMDB with the CI information. When the CI information indicates a new CI, the CI-identifying section 102 may pass the information to the CI-instance creating section 103. In contrast, when the CI information indicates an updated attribute or relation value of an existent CI, the CI-identifying section 102 may pass the information to the attribute-and-relation updating section 104.

The CI-instance creating section 103 may create a set of data identifying a predetermined attribute of the CI and relations with other CIs. This set of data may be created based on CI information in a data model 201 stored in the model table 107, and a relation model 204 stored in the relation table 108. This set of data may be implemented by an instance of static data, or by a Java® class instance.

An example of the set of data is a CI instance. The set of data may be stored in the CMDB 105. The attributes and relations of the set of data may be stored in the CI instance 203 or, alternatively, the attributes may be stored in the CI instance data and the relations may be stored as relation instance data in the CMDB 105. In the latter case, the CI instance may include a link for specifying a related relation instance.

The attribute-and-relation updating section 104 may achieve tracking together with the discovery section 101. The attribute-and-relation updating section 104 may reflect the updated attribute or relation value of a CI to the CI instance of the CI stored in the CMDB. In other words, the attribute-and-relation updating section 104 may update the attribute or relation value of the CI instance of the CI. The update may be executed by replacing the value with CI information discovered by the discovery section 101. The replacement may replace all attribute or relation values of the CI instances with the CI information discovered by the discovery section 101, or may replace only values that differ.

The CMDB 105 may store the CI instance 203 of the CI.

The discovery table 106 may store the discovery data 202. The discovery data 202 may be used when the discovery section 101 discovers CI information. The discovery data 202 may be implemented as, for example, an instance of static data or a Java® class instance. Discovery data may also be referred to as a discovery policy. The discovery data 202 may include a range to be searched by the discovery section 101, that is, object CIs to be collected (scope), attributes to be collected, and relations to be collected, which may be included in the search range for the CI.

The object to be collected may be specified using, for example, a subnet IP address, an IP address range, an IP address, a MAC address, a device identifier, a host name, a database name, or a combination thereof. Alternatively, the object to be collected may include a schedule managing database (not shown) connected to the computer system 100 over a network. The schedule managing database may store, for example, data on process management that uses devices. As a further alternative, the object to be collected may include a database (not shown) that stores a batch processing definition file. Where the object to be collected is a database that stores the batch processing definition file, the discovery section 101 may discover information by reading the content of the batch processing definition file. The batch processing definition file may store, for example, data regarding which device is to be used in what order.

The model table 107 may store the data model 201. The data model 201 may be used when one set of data indicating a predetermined attribute of each CI and relations with other CIs is created by the CI-instance creating section 103.

The relation table 108 may store the relation model 204. The relation model 204 may be used when one set of data indicating a predetermined attribute of each CI and relations with other CIs is created by the CI-instance creating section 103.

As shown in FIG. 1A, the discovery section 101 may discover information regarding object CIs connected to the computer system 100 over a network. The discovery section 101 may further discover information on a service A and a service B, and a relation between the services A and B. Then, the CI identifying section 102 may determine, with reference to the CMDB 105, whether the discovered information is a new CI. In accordance with the determination, the CI-instance creating section 103 may create the CI instance of the service A, the CI instance of the service B, and the instance of the relation (usedBy) between the services A and B. The CI-instance creating section 103 may store the created instances in the CMDB 105. FIG. 1A shows that the CI instance of the service B has a relation of usedBy with the CI instance of the service A.

The discovery section 101 may create the attributes of the CIs and a relation between the CIs according to the data model 201 on the basis of the information on the discovered CIs, and may register them in the CMDB 105. The CMDB 105 may store the attributes of the CIs and relations with other CIs. The system administrator may thus extract a real dependency relation between the CIs using the CMDB 105.

FIG. 1A describes configuration items using service configuration items such as service A and service B, for example. The above description may also apply to a case in which the service configuration item may be replaced with a hardware configuration item or another configuration item.

Figure 1B:
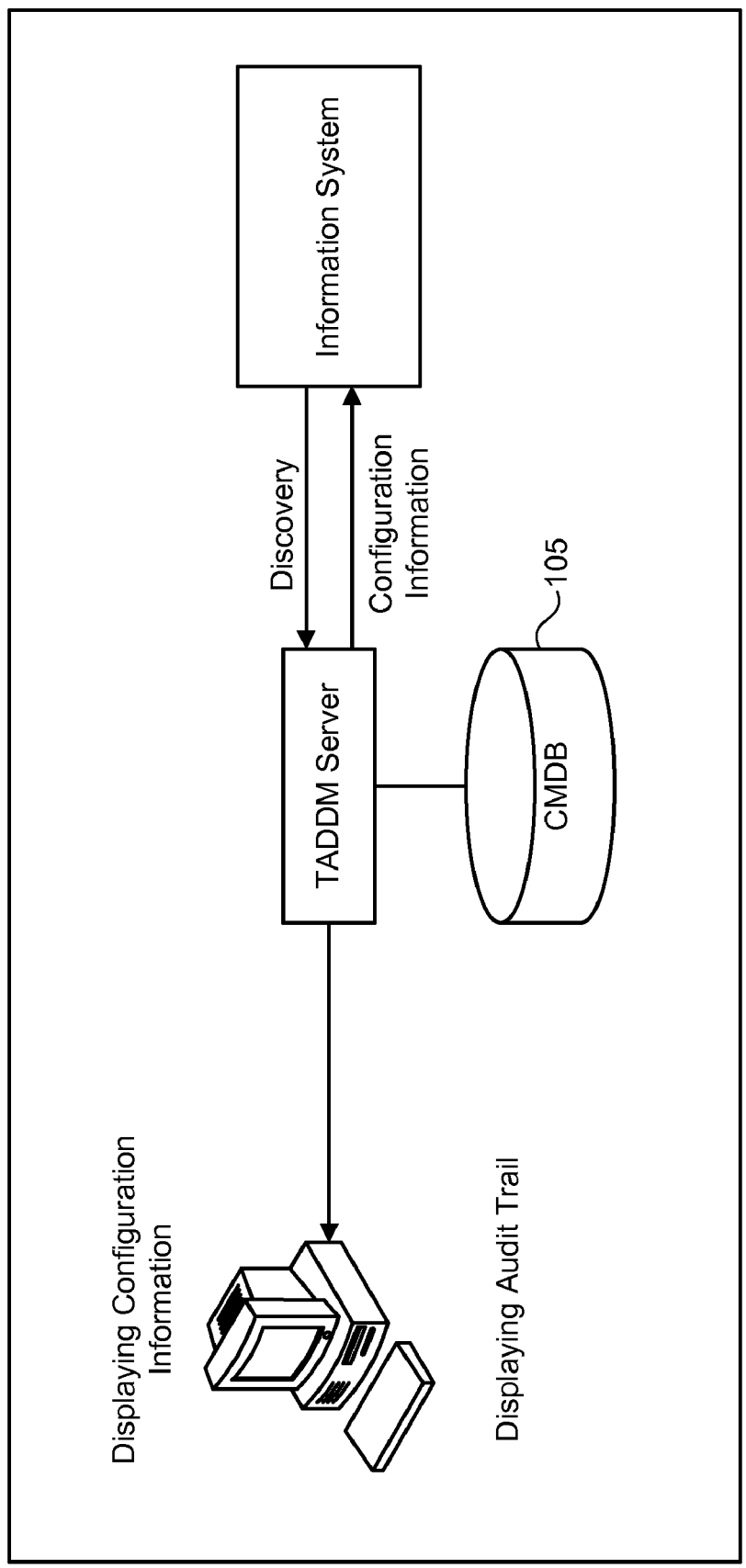
FIG. 1B is a high-level block diagram depicting tools for configuration management.

FIG. 1B depicts an example of tools for configuration management. Tools for configuration management may automatically collect information ("discovery") on configuration items ("configuration information"), graphically display configuration information ("topology"), and analyze audit trail and comparing configurations ("analytics"). For example, a TADDM server may acquire configuration information of an information system using SSH, SNMP, WMI or the like. Examples of the configuration information may include a kind or configuration of operating systems of individual information systems and a kind or configuration value of an application. The TADDM server may store the acquired information in the CMDB as CI instances. The TADDM server may send configuration information and audit trail information to an administrator's computer according to a CI instance stored in the CMDB. The administrator's computer may display the configuration information and audit trail using the information.

Figure 2A:
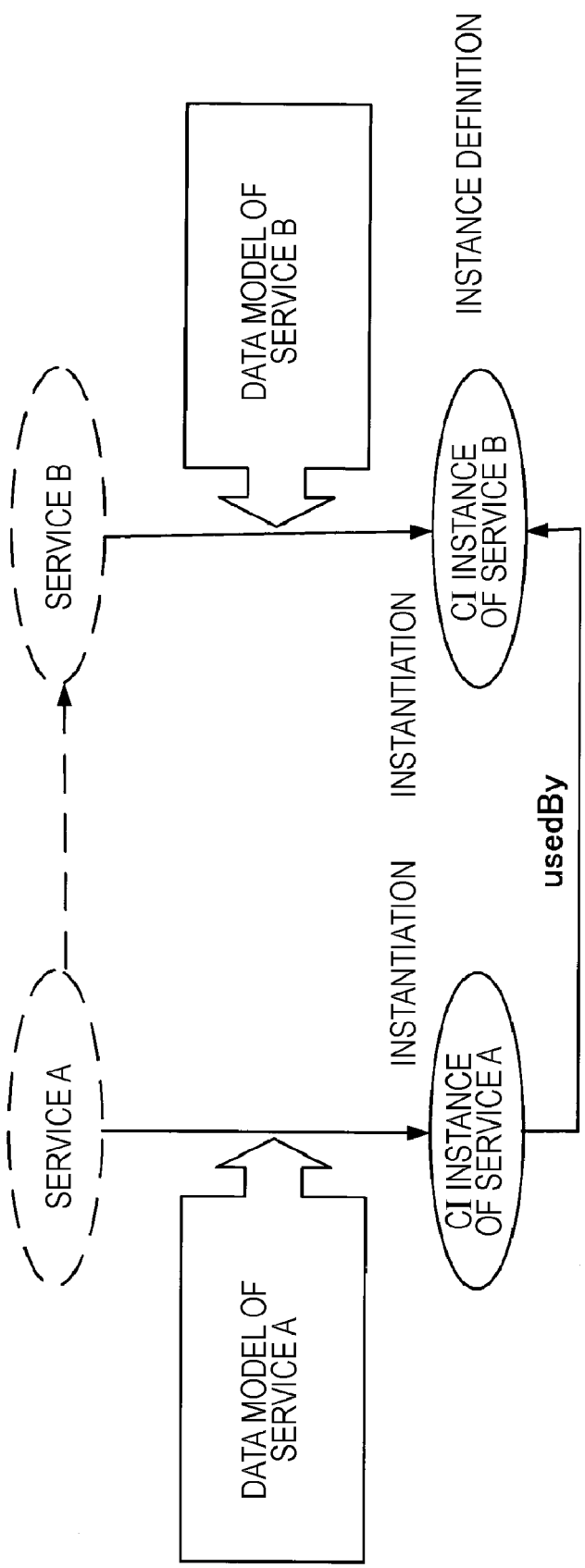
FIG. 2A depicts creation of CI instances of a service A and a service B and their relation instances in accordance with certain embodiments of the invention.
Figure 2B:
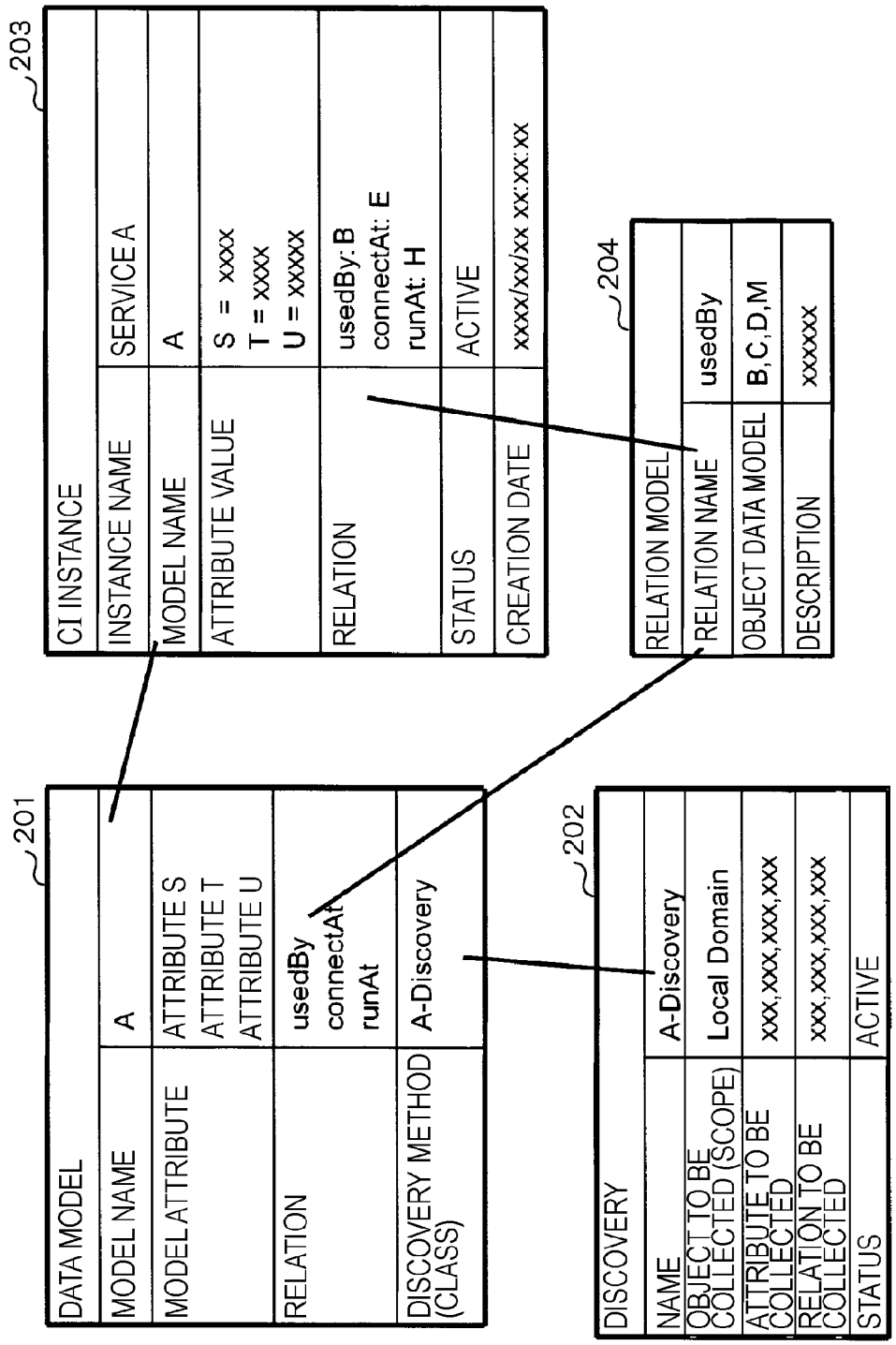
FIG. 2B illustrates a data model, a discovery instance, a CI instance, and a relation model in accordance with embodiments of the invention.

FIG. 2A depicts creation of CI instances of CIs (for example, service A and service B) and the instance of a relation (usedBy) between services A and B. The CI instance of service A may be created by the CI-instance creating section 103 from the information on service A discovered by the discovery section 101. Likewise, the CI instance of service B may be created by the CI-instance creating section 103 from the information on service B discovered by the discovery section 101. The data models of services A and B may be stored in the model table 107. The instance of the relation between the CIs, that is, the relation (usedBy) between services A and B, may be created by the CI-instance creating section 103 from the information on service A discovered by the discovery section 101, and the relation model 204. The relation model 204 may be stored in the relation table 108.

When services B1, B2, and B3 are present, information on services B1, B2, and B3 may be instantiated using the data model of the service B so that the CI instance of the service B1, the CI instance of the service B2, and the CI instance of the service B3 may be created. The CI instances of the service B1, B2, and B3 may also be stored in the CMDB 105.

FIG. 2B depicts the data model 201 stored in the model table 107, the discovery data 202 stored in the discovery table 106, the CI instance 203 stored in the CMDB 105, and the relation model 204 stored in the relation table 108. The data model 201 may be a schema for defining CIs. For example, the data model 201 may include a "model name" that identifies a CI, a "model attribute" indicative of the attribute of the CI designated by the model name, a "relation" indicative of relations between the CI designated by the model name and other CIs, and a "discovery method" that specifies a discovery instance for discovering the CI designated by the model name.

The "model attribute" may be defined by attributes included in, for example, IBM configuration management database model CDM. The administrator of the CMDB may designate any attribute in the data model 201. The "relation" may be defined according to the relations defined in the CDM, for example. The "discovery method" may be specified by a discovery instance name. As shown in FIG. 2B, the discovery method is A-Discovery.

The discovery data 202 may include a "name" of a discovery instance specified by the discovery method in the data model 201, an "object to be collected (scope)," an "attribute to be collected" and a "relation to be collected" for an object to be managed (CI), which may be collected by the discovery section 101. In some embodiments, a"status" may indicate whether the discovery instance is active or inactive.

The CI instance 203 may include an "instance name" for identifying the CI of the instance, a "model name" indicative of which data model is used to create the instance, an "attribute value" of an attribute specified by the data model, the descriptions (values) of individual relations specified by the data model, a "status" indicative of whether the instance is active or inactive, and a "creation date" on which the CI instance was created. In some embodiments, the CI instance may further include a CI instance identifier unique to the CI instance.

The CI instance identifier may be provided to discriminate the CI instance from other CI instances. For example, the CI instance identifier may be a host name, a serial number, or a combination of other attributes values. As shown in FIG. 2B, the CI instance 203 may indicate that it is the CI instance of the service A, it is instantiated using a data model A, it includes attributes S, T, and U each having a value, it is used by B (usedBy:B), connected to E (connectAt:E), and running at H (runAt:H), and that it is active. The creation date of the CI instance may also be included.

The relation model 204 may include a schema for defining a relation specified by the data model 201. The relation model 204 may include a "relation name," such as "usedBy," "object data model" for specifying data models which are the objects of the relation, and "description" of the relation.

Figure 3A:
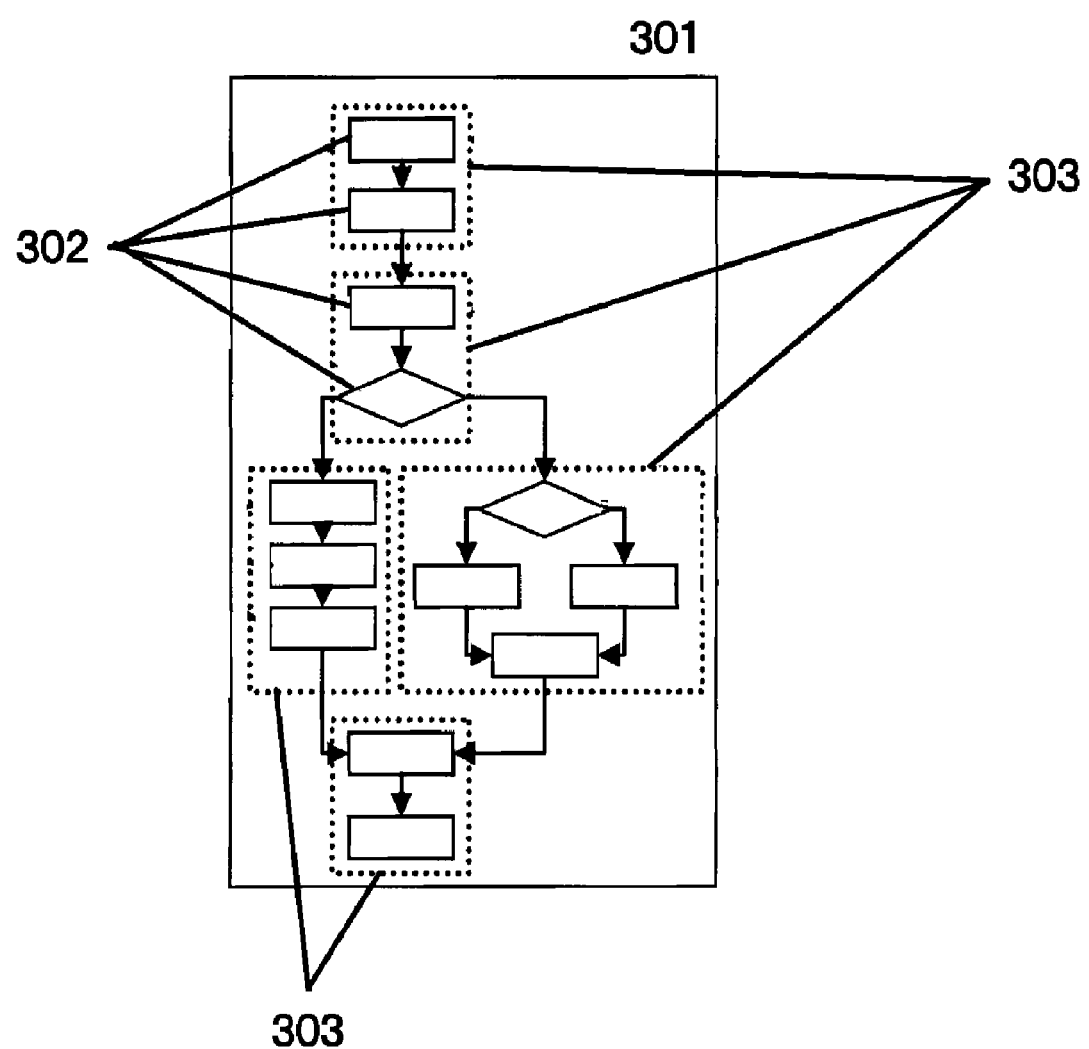
FIG. 3A illustrates an example of service configuration items in accordance with an embodiment of the invention.

Referring now to FIG. 3A, a service configuration item may include, for example, any one of a service process 301 as one unit, a plurality of service processes (not shown) as one unit, a service step 302 as one unit, and a plurality of service steps 303 as one unit.

Referring now to FIG. 3B, exemplary combinations of service configuration items are shown. Reference numeral 311 shows one service process 314 as one service configuration item and another service process 315 as another service configuration item. Reference numeral 312 shows one service process 316 as one service configuration item and a plurality of service steps 317 in another service process as another service configuration item. Reference numeral 313 shows a plurality of service steps 318 in one service process as one service configuration item and a plurality of service steps 319 in another service process as another service configuration item.

FIG. 3C shows a data model 311, a CI instance 313 (of service A) and a relation model 314. The data model 311 may be stored in the model table 107. Similarly, the CI instance 313 may be stored in the CMDB 105, and the relation model 314 may be stored in the relation table 108.

In some embodiments, the data model 311 may include an "action type" attribute and an "influenced area" attribute, in addition to the attributes in the data table 201. The attribute "action type" may include, for example, "new," "change," "delete," "refer," and "search." The attribute "influenced area" may include, for example, a level indicative of a distance from a CI designated by a model name, the model name of a CI instance, and a relation.

Likewise, in some embodiments, the CI instance 313 may include an "action type" attribute and an "influenced area" attribute, in addition to the attributes of the CI instance 203. The attribute "action type" of the CI instance 313 may include at least one instance of the action types defined in the data model 311.

As described in more detail below with reference to FIG. 5, certain embodiments may not include the discovery data 202, since a status control section 503 may dynamically define CI instances corresponding to service processes in the CMDB, and relations between CIs that are the objects of the service processes. In other embodiments, the discovery data 202 may be unnecessary since a process engine may define a parameter for pointing to an object CI of a service process.

FIGS. 3D to 3H show examples of a policy (an object-area specifying policy) for use in specifying the object area of an action corresponding to a service configuration item. Examples of conditions of an object-area specifying policy are shown below.

1. Examples of object-area specifying policy having vertical dependency relation of OS, middleware, and application Object-area specifying policy A: CIs having a relation of "InstalledOn" therebetween.

Object-area specifying policy B: CIs having a relation of one node from an object configuration item and conforming to the object-area specifying policy A 2. Examples of object-area specifying policy for configuration items on multiple servers that constitute business application Object-area specifying policy C: two-way CIs having a relation of "UsedBy"

Object-area specifying policy B: CIs conforming to the object-area specifying policy C and also the object-area specifying policy A 3. Others CIs having a given relation, whose type attribute is "middleware"

The condition description format and conditions designated may be implemented by an appropriate method. For example, conditions may be described using an XML language. Examples of conditions to be designated include an attribute and a relation.

Examples of extraction of configuration items related to a configuration item using the object-area specifying policies A to D will be described in more detail below.

Figure 3D:
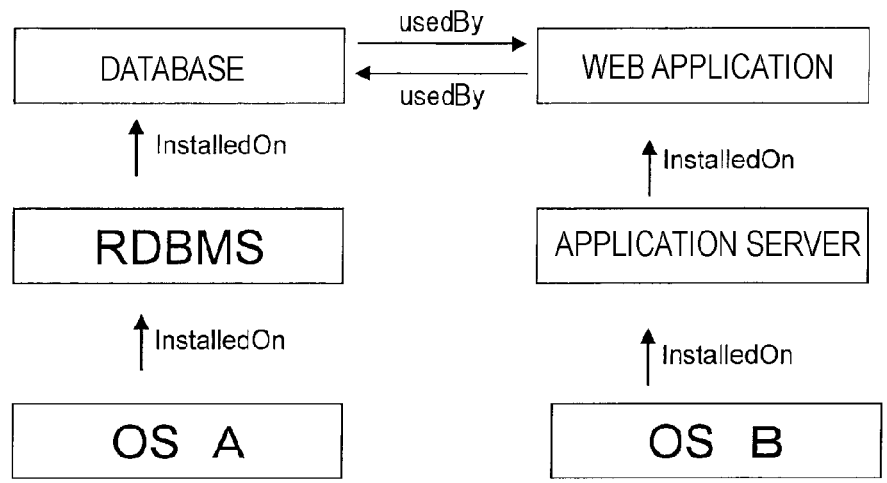
FIG. 3D illustrates exemplary configuration items and relations between the configuration items for use in describing object-area specifying policies in accordance with an embodiment of the invention.

FIG. 3D shows exemplary configuration items and relations between configuration items for describing applicable object-area specifying policies. While FIG. 3D shows particular software configuration items for simplicity, the software configuration items may be replaced with service configuration items or hardware configuration items as needed to describe applicable object-area specifying policies.

As shown in FIG. 3D, an operating system ("OS") A may include a relation of "InstalledOn" with a relational database management system ("RDBMS"). The RDBMS may include a relation of "InstalledOn" with a database. An OS B may include a relation of "InstalledOn" with an application ("App") server. The App server may include a relation of "InstalledOn" with a Web application. The database and the Web application may have a mutual relation of "usedBy".

Figure 3E:
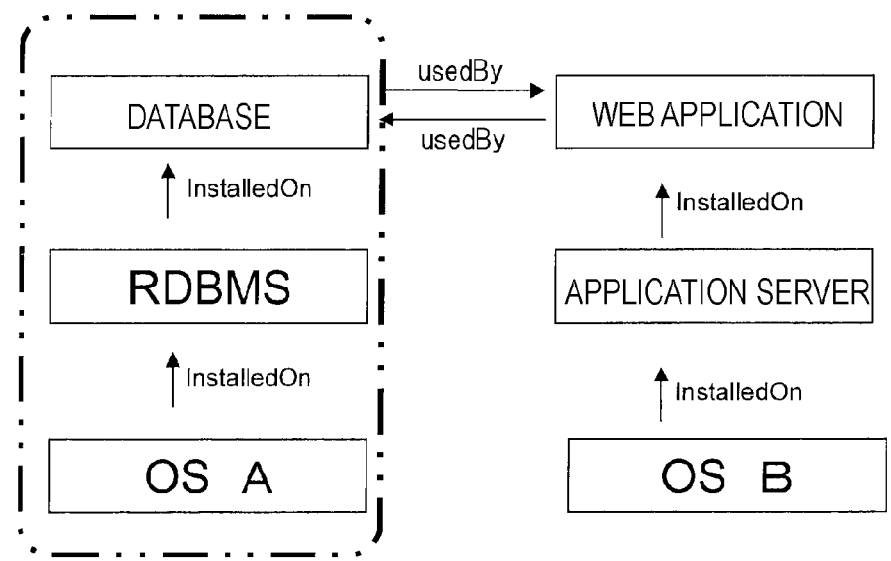
FIG. 3E illustrates an example of an object-area specifying policy A in accordance with an embodiment of the invention.

FIG. 3E shows an example in which the object-area specifying policy A in accordance with certain embodiments of the invention may be used. When the database is designated as a CI and the object-area specifying policy A is designated, CIs having a relation of "InstalledOn" may be specified as configuration items in the object area of the action. As a result, the software configuration items, the database, the RDBMS, and the OS A may be specified.

Figure 3F:
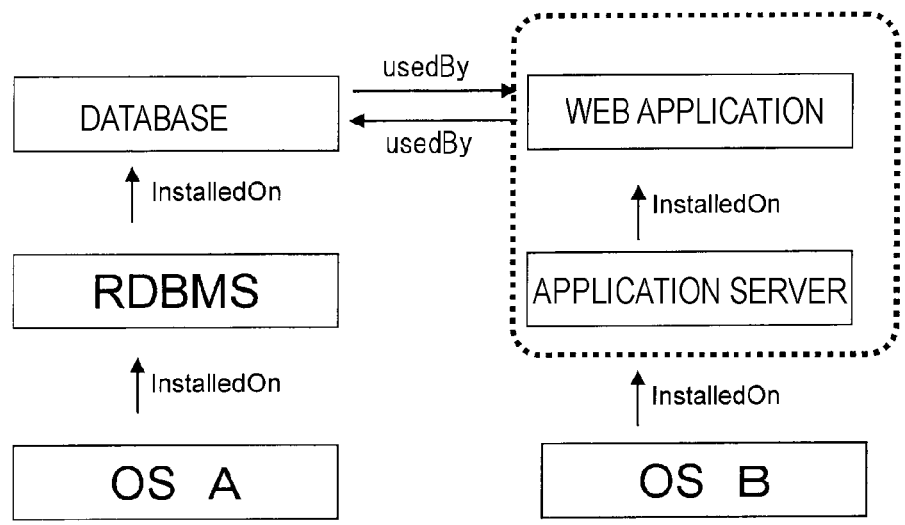
FIG. 3F illustrates an example of an object-area specifying policy B in accordance with an embodiment of the invention.

FIG. 3F shows an example in which the object-area specifying policy B in accordance with certain embodiments of the invention may be used. When the Web application is designated as a CI and the object-area specifying policy B is designated, CIs having a relation of "InstalledOn" and having a relation of one node may be specified as a configuration item in the object area of the action. As a result, the software configuration items, the Web application, and the App server may be specified.

Figure 3G:
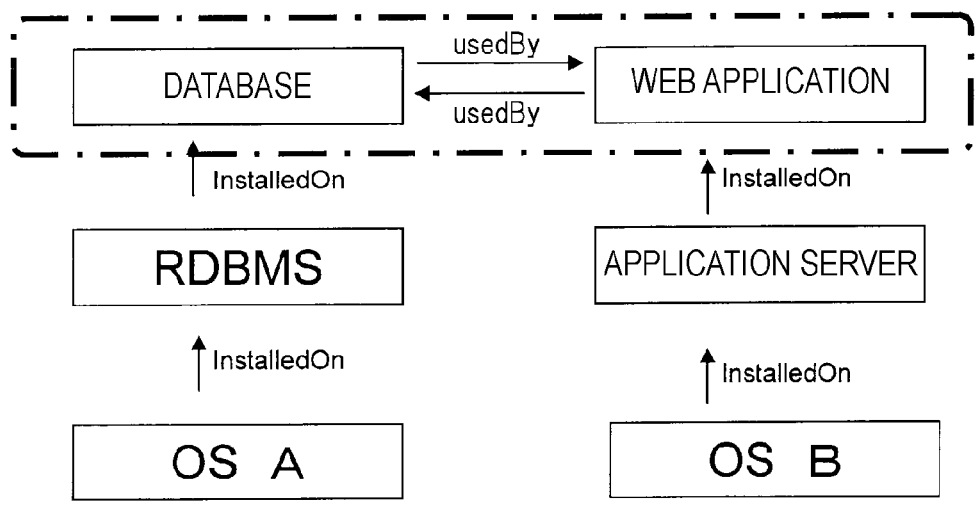
FIG. 3G illustrates an example of an object-area specifying policy C in accordance with an embodiment of the invention.

FIG. 3G shows an example in which the object-area specifying policy C in accordance with certain embodiments of the invention may be used. When the database is designated as a CI and the object-area specifying policy C is designated, software configuration items having a two-way relation of "usedBy" may be specified as configuration items. As a result, the software configuration items, the database, and the Web application may be specified.

Figure 3H:
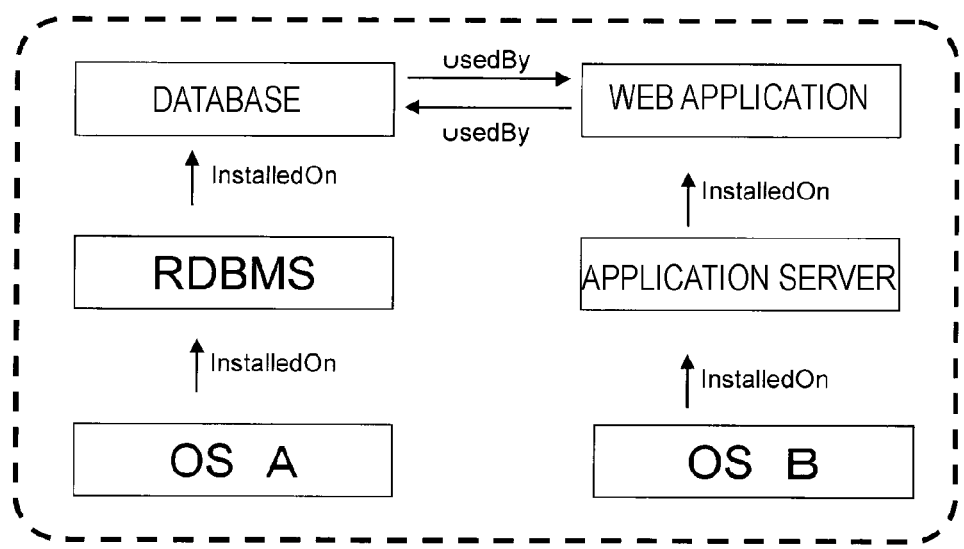
FIG. 3H illustrates an example of an object-area specifying policy D in accordance with an embodiment of the invention.

FIG. 3H shows an example in which the object-area specifying policy D in accordance with certain embodiments of the invention may be used. When the database is designated as a CI and the object-area specifying policy D is designated, the database and the Web application may be first specified as configuration items in the object area of the action, and the CIs having a relation of "InstalledOn" may then be specified as configuration items in the object area of the action. As a result, the software configuration items, the database, the RDBMS, the OS A, the Web application, the App server, and the OS B may be specified.

Figure 4:
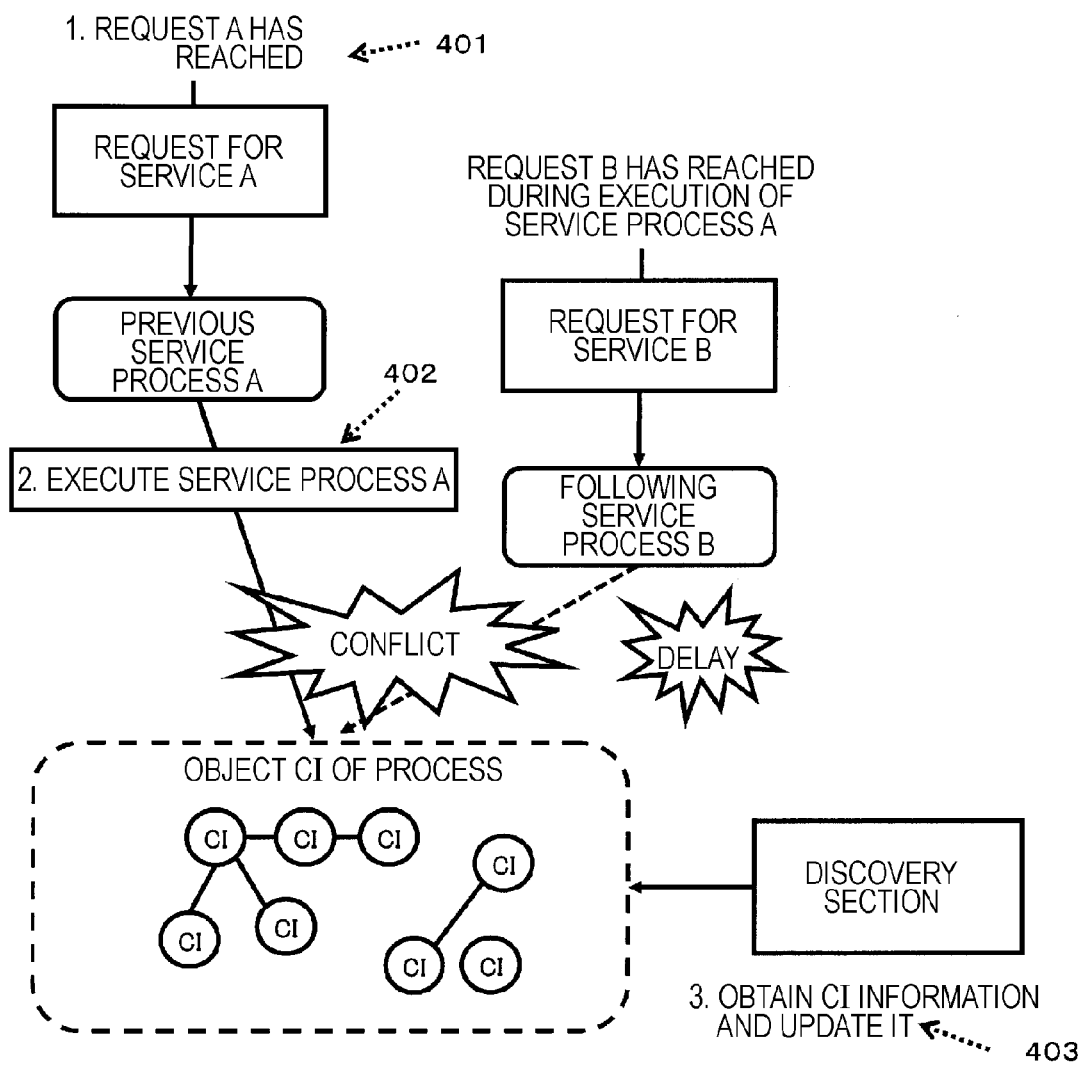
FIG. 4 depicts an example of conventional service processing.

FIG. 4 shows an example of conventional service processing. As shown, a service process A may be a process for processing a request for service process A. Service process B may be a process for processing a request for service process B. Service process A and service process B may refer to the same CIs.

In conventional service processing, administrators of the individual service processes A and B may define service process A and service process B, respectively, and may store the defined service processes A and B in a storage unit. To execute service process A, the administrator of service process A may issue a request for service process A. When the request has reached 401 the storage unit, a process engine may read the service process A from the storage unit and may execute 402 the service process A. After execution of the service process A, the discovery section 101 may acquire 403 information regarding configuration items. The attribute-and-relation updating section 104 may update 403 the attribute values or the relation values of the CI instances in the CMDB according to the acquired CI information.

In conventional service processing, the following problems may occur when the administrator of service process B issues a request for service process B to refer to the same CI as that referred to in service process A during execution of service process A. When the administrator of service process B realizes the presence of service process A, the administrator of service process B may iteratively request for service process B until execution of the service process A has been completed. In this manner, the CI information may be updated to avoid a potential conflict of service processes A and B, even if there is no actual conflict. Alternatively, if the administrator of service process B does not realize the presence of service process A, service process B may be executed at the same time as service process A. In this case, a conflict may occur between service processes A and B such that one or both of the service processes A and B may fail.

Figure 5:
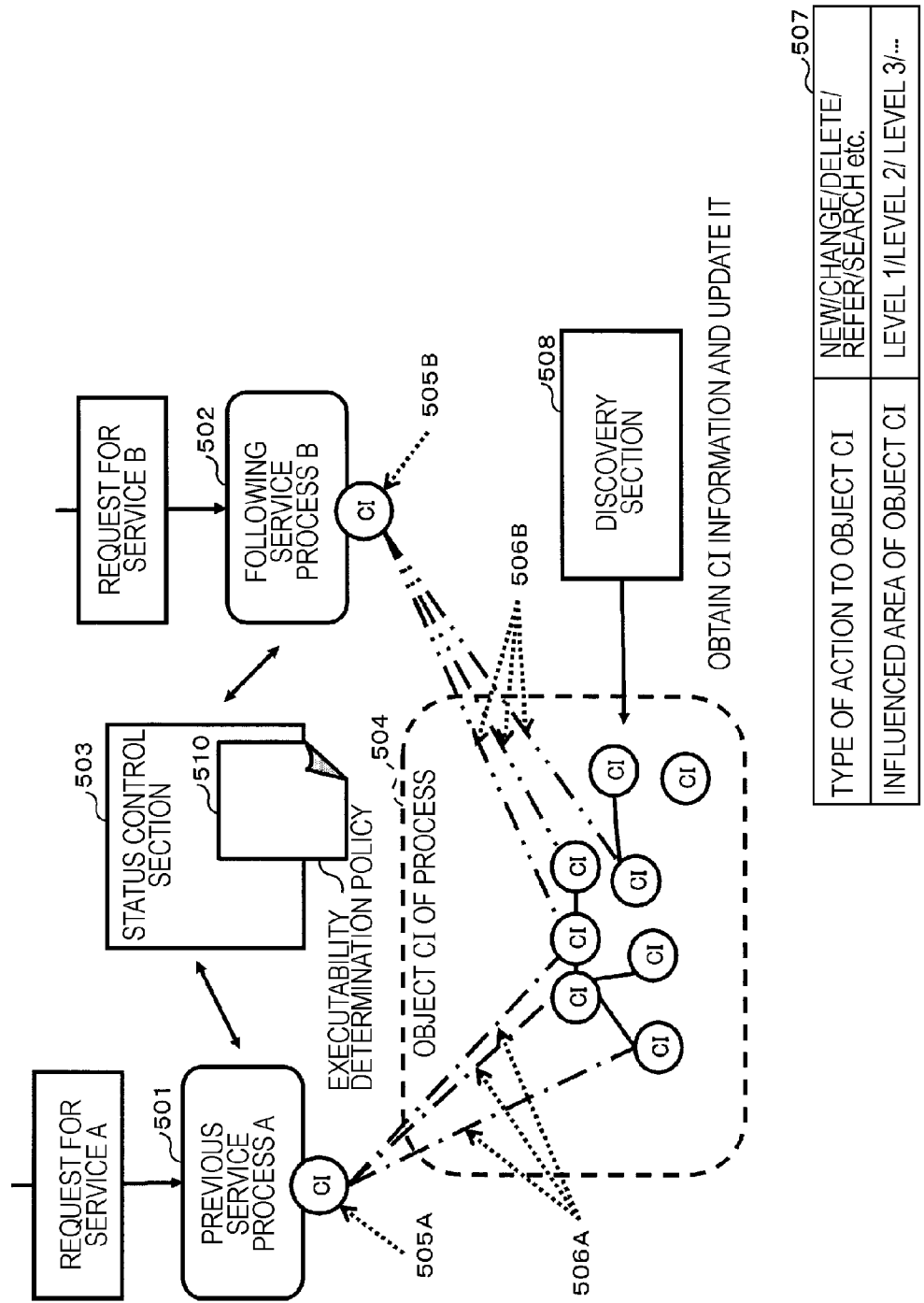
FIG. 5 is a high-level block diagram illustrating management of action execution for a service configuration item in accordance with embodiments of the invention.

FIG. 5 illustrates an example of execution management of an action corresponding to a service configuration item in accordance with embodiments of the invention. Particularly, the system administrator, or the administrator of a service process A 501, may define an object CI attribute 507 that indicates the action type and the influenced area of a CI that is the object of an action corresponding to the service process A 501 (also referred to as the "object CI of the service process A"). Likewise, the system administrator, or the administrator of a service process B 502, may define an object CI attribute 507 that may indicate the action type and the influenced area of a CI that is the object of an action corresponding to service process B 501 (also referred to as the "object CI of the service process B").

The above definitions may be instantiated using the information defined in the attribute "action type" and the attribute "influenced area" in the data model 311. An example of the CI instance 313 thus instantiated is shown FIG. 3C. Alternatively, the definitions may be made by the administrators of the service processes, separately from the data model 311, and may be stored in a storage medium such as the CMDB.

The object CI attribute 507 may include an action type for an object CI and the influenced area of the object CI. Examples of "action type" may include "new," "change," "delete," "refer," and "search." Examples of "influenced area" may include a "level" indicating a distance from a CI designated by a model name, a "model name of CI instance," and a "relation."

Examples of implementation of the object CI attribute 507 are provided below.

In one example, a status control section 503 may dynamically define CI instances 505A and 505B corresponding to service process A 501 and service process B 502, for example, in a CMDB. The status control section 503 may further define relations 506A between the service process A 501 and objects CI of the service process A 501. The status control section 503 may also define relations 506B between the service process B 502 and object CIs of the service process B 502. Alternatively, the system administrator or the administrator of the service process A or B may define parameters for pointing object CIs of service process A 501 and service process B 502 in service process A 501 and service process B 502, respectively.

The status control section 503 may manage the object CI attributes of all service processes 501 and 502 being executed, so as to manage the dependency relation between service process A 501 and service process B 502. A case will now be described where a request for a service process B 502 may be issued during execution of a preceding service process A 501.

Service process A 501 and service process B 502 may have individual defined object CI attributes 507 in the CMDB. A process engine (not shown) may provide the object CI attribute 507 of service process A 501 to the status control section 503 at the beginning of service process A 501. In response to a request for service B, the process engine (not shown) may provide the object CI attribute 507 to the status control section 503 at the beginning of service process B 502, and may refer to the object CI attribute 507 of service process A 501 through the status control section 503.

The status control section 503 may determine the executability of the executed service process B 502 from the object CI attributes 507 of the executed service process B 502 and service process A 501. The determination may be made using an executability determination policy 510 defined in the status control section 503. The executability determination policy 510 may include data that defines operation rules for a case in which the same configuration items are used by more than one service.

The determination may also be made by an administrator of service process B 502 that is executed by the process engine (not shown). The administrator of service process B 502 may determine whether to execute an action of the service process B 502, or keep the action waiting via an interface, displayed on the display of a management apparatus, which allows selective execution of the action.

A discovery section 508 may acquire CI information after execution of service process A 501 and service process B 502. Next, the attribute-and-relation updating section 104 may update the attribute values or relation values of the CI instances according to the acquired CI information.

Examples of executability determination policy 510 descriptions are provided below:

1. process1(change) and process2(ANY)→wait (the preceding process (change) keep the following process (ANY) waiting)

This example is a policy that a following process (process2) may be kept waiting irrespective of the action type of the following process (process2), provided that the action type of a preceding process (process1) is "change."

2. process1(ANY) and process2(delete, change)→wait (the preceding process (ANY) keep the following process (delete or change) waiting)

This example is a policy that the following process (process2) may be kept waiting irrespective of the action type of the preceding process (process1), provided that the action type of the following process (process2) is "delete" or "change."

3. process1(change, delete) and process2(ANY)→wait (the preceding process (change or delete) keep the following process (ANY) waiting)

This example is a policy that the following process (process2) may be kept waiting irrespective of the action type of the following process (process2), provided that the action type of the preceding process (process1) is "delete" or "change."

4. process1(ANY) and process2(delete)→wait (the preceding process (ANY) keep the following process (delete) waiting)

This example is a policy that the following process (process2) may be kept waiting irrespective of the action type of the preceding process (process1), provided that the action type of the following process 2 is "delete."

5. process1(search, refer) and process2(search, refer)→go (the preceding process (search or refer) execute the following process (search or refer))

This example is a policy that the following process (process2) may be executed when the action type of the preceding process (process1) is "search" or "refer" and when the action type of the following process (process2) is "search" or "refer." When the action types of the preceding and following processes are "search" or "refer," no disagreement may occur, even if the order of execution is reversed. Therefore, it is determined that the following process may be executed.

6. process1(search, refer) and process2(change)→wait (the preceding process (search or refer) keep the following process (change) waiting)

This example is a policy that the following process (process2) may be kept waiting even if the action type of the preceding process (process1) is "search" or "refer," provided that the action type of the following process (process2) is "change." When the action type of the preceding process is "search" or "refer," disagreement may occur if the following process first executes a change. Therefore, it may be determined that the following process should be kept waiting. In some embodiments, when multiple preceding processes are present, a determination of whether to execute a next process may be made upon completion of each preceding process.

Figure 6:
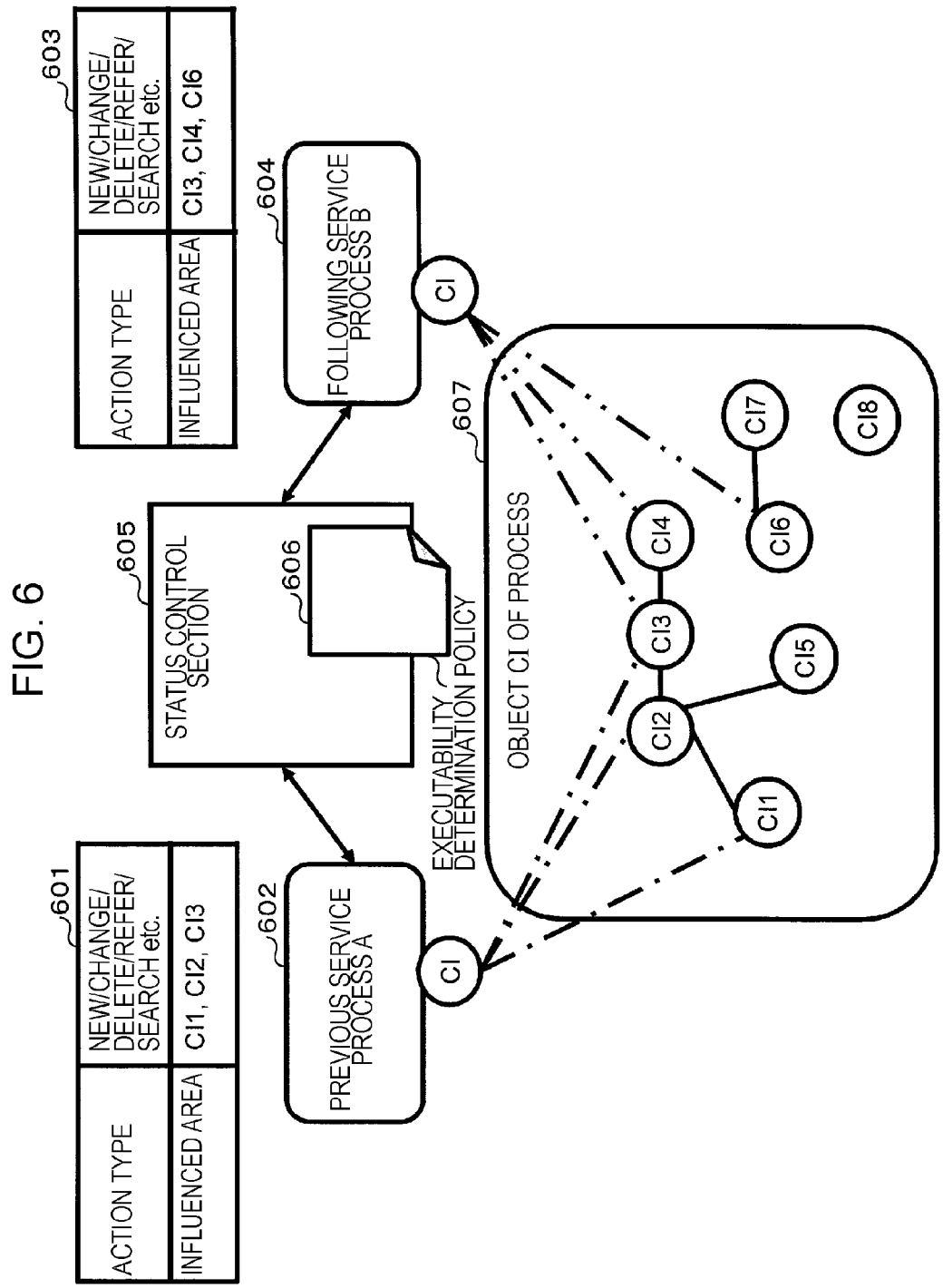
FIG. 6 is a flowchart of a method for determining whether a service process may be executed in accordance with an embodiment of the invention.

FIG. 6 illustrates a method for determining whether to execute service processes in accordance with an embodiment of the invention. In one embodiment, a request for a following process B 604 may be issued during execution of a preceding process A 602.

In this embodiment, the respective object CI attributes 601 and 603 of service process A 602 and service process B 604 may be provided to a status control section 605 at the beginning of service process A 602 and service process B 604. Whether service process A 602 and service process B 604 may be executed may be determined by the status control section 605 or by administrators of service process A 602 and service process B 604, respectively. If the order of execution of service process A 602 and service process B 604 is reversed, the status control section 605 or the administrators of service process A 602 and service process B 604 may determine that service process A 602 and service process B 604 of the new request may be executed, provided that the update information on an object CI 607 may be held unique.

In other embodiments, the status control section 605 may determine executability, or administrators of service process A 602 and service process B 604 may determine executability. In the first case, object CIs (CI1, CI2, and CI3) defined in the influenced area of the object CI included in an object CI attribute 601 of the preceding service process A 602, and object CIs (CI3, CI4, and CI6) defined in the influenced area of the object CI included in an object CI attribute 603 of the following service process B 604, may not overlap. The status control section 605 may then determine that the following service process B 604 may be executed.

When the object CIs defined in the influenced area do overlap, the status control section 605 may use an executability determination policy 606 defined in the status control section 605 to determine whether the following service process B 604 may be executed. The executability determination policy 606 may be defined in the status control section 605 by, for example, the administrator. Examples of the status control section 605 determining the action of the following service process B 604 using the executability determination policy 606 follow.

1. process1(change) and process2(ANY)→wait
(the preceding process (change) keep the following process (ANY) waiting)

This example is a policy that the following service process B 604 may be kept waiting irrespective of the action type of the following service process B 604, provided that the action type of the preceding service process A 602 is "change." When the action type of the preceding service process A 602 is "change," the status control section 605 may keep the following service process B 604 waiting.

2. process1(ANY) and process2(delete, change)→wait
(the preceding process (ANY) keep the following process (delete or change) waiting)

This example is a policy that the following service process B 604 maybe kept waiting irrespective of the action type of the preceding service process A 602, provided that the action type of the following service process B 604 is "delete" or "change." When the action type of the following service process B 604 is "delete" or "change," the status control section 605 may keep the following service process B 604 waiting.

3. process1(change, delete) and process2(ANY)→wait
(the preceding process (change or delete) keep the following process (ANY) waiting)

This example is a policy that the following service process B 604 may be kept waiting irrespective of the action type of the following service process B 604, provided that the action type of the preceding service process A 602 is "change" or "delete." The status control section 605 may keep the following service process B 604 waiting irrespective of the action type of the following service process B 604.

4. process1(ANY) and process2(delete)→wait
(the preceding process (ANY) keep the following process (delete) waiting)

This example is a policy that the following service process B 604 may be kept waiting irrespective of the action type of the preceding service process A 602, provided that the action type of the following service process B 604 is "delete." When the action type of the following service process B 604 is "delete," the status control section 605 may keep the following service process B 604 waiting.

5. process1(search, refer) and process2(search, refer)→go
(the preceding process (search or refer) execute the following process (search or refer))

This example is a policy that the following service process B 604 may be executed when the action type of the preceding service process A 602 is "search" or "refer" and when the action type of the following service process B 604 is "search" or "refer." When the action types of the preceding and following processes are "search" or "refer," no disagreement may occur, even if the order of execution is reversed. Therefore, the status control section 605 may determine that the following process can be executed.

6. process1(search, refer) and process2(change)→wait
(the preceding process (search or refer) keep the following process (change) waiting)

This example is a policy that the following service process B 604 may be kept waiting even if the action type of the preceding service process A 602 is "search" or "refer," provided that the action type of the following service process B 604 is "change." When the action type of the preceding service process A 602 is "search" or "refer," disagreement may occur if the following service process B 604 first executes a change. Therefore, the status control section 605 may determine that the following service process B 604 should be kept waiting.

In another embodiment, the administrators of service process A 602 and service process B 604 may determine executability. The determination may be made such that a process engine displays a popup window, for example, that allows the administrator of service process A 602 to designate whether to execute service process A 602 or to keep service process A 602 waiting. Likewise, the determination may be made such that the process engine displays a popup window, for example, that allows the administrator of service process B 604 to designate whether to execute service process B 604 or keep service process B 604 waiting. The following provides an example in which administrators of service process A 602 and service process B 604 determine executability.

Preceding process (delete) determine whether to execute the following process (ANY)

This example shows that the process engine may require the administrator to determine whether to execute the following service process B 604 irrespective of the action type of the following service process B 604, provided that the action type of the preceding service process A 602 is "delete."

Preceding process (new) determine whether to include a new CI in the object of search in the following process (search)

This example shows that the process engine may require the administrator to determine whether to include a new CI in the object of search in the following service process B 604 when the action type of the preceding service process A 602 is "new" and the action type of the following service process B 604 is "search."

Although the example in FIG. 6 uses the model names of CI instances as an influenced area, the influenced area may be expressed using a level indicative of a distance from a node or a relation. The influenced area may be dynamically determined using a policy to specify the object area of an action corresponding to a service configuration item (an "object-area specifying policy").

In some embodiments, a level indicative of a distance from a node may be used as an influenced area. When CIs that are configuration items in such a level (defined as the influenced area of the object CI included in the object CI attribute 601 of the preceding service process A 602), and object configuration items in such a level (defined as the influenced area of the object CI included in the object CI attribute 603 of the following service process B 604) do not overlap, the status control section 605 may determine that the following service process B 604 may be executed. If the influenced areas overlap, the status control section 605 may determine the action of the following service process B 604 using the executability determination policy 606 defined in the status control section 605.

In other embodiments, an expression using a relation may be used as an influenced area. When CIs obtained from such an expression (defined as the influenced area of an object CI included in the object CI attribute 601 of the preceding service process A 602) and CIs obtained from another such expression (using a relation defined in the influenced area of an object CI included in the object CI attribute 603 of the following service process B 604) do not overlap, the status control section 605 may determine that the following service process B 604 may be executed. If the influenced areas overlap, the status control section 605 may determine the action of the following service process B 604 using the executability determination policy 606 defined in the status control section 605.

Figure 7B:
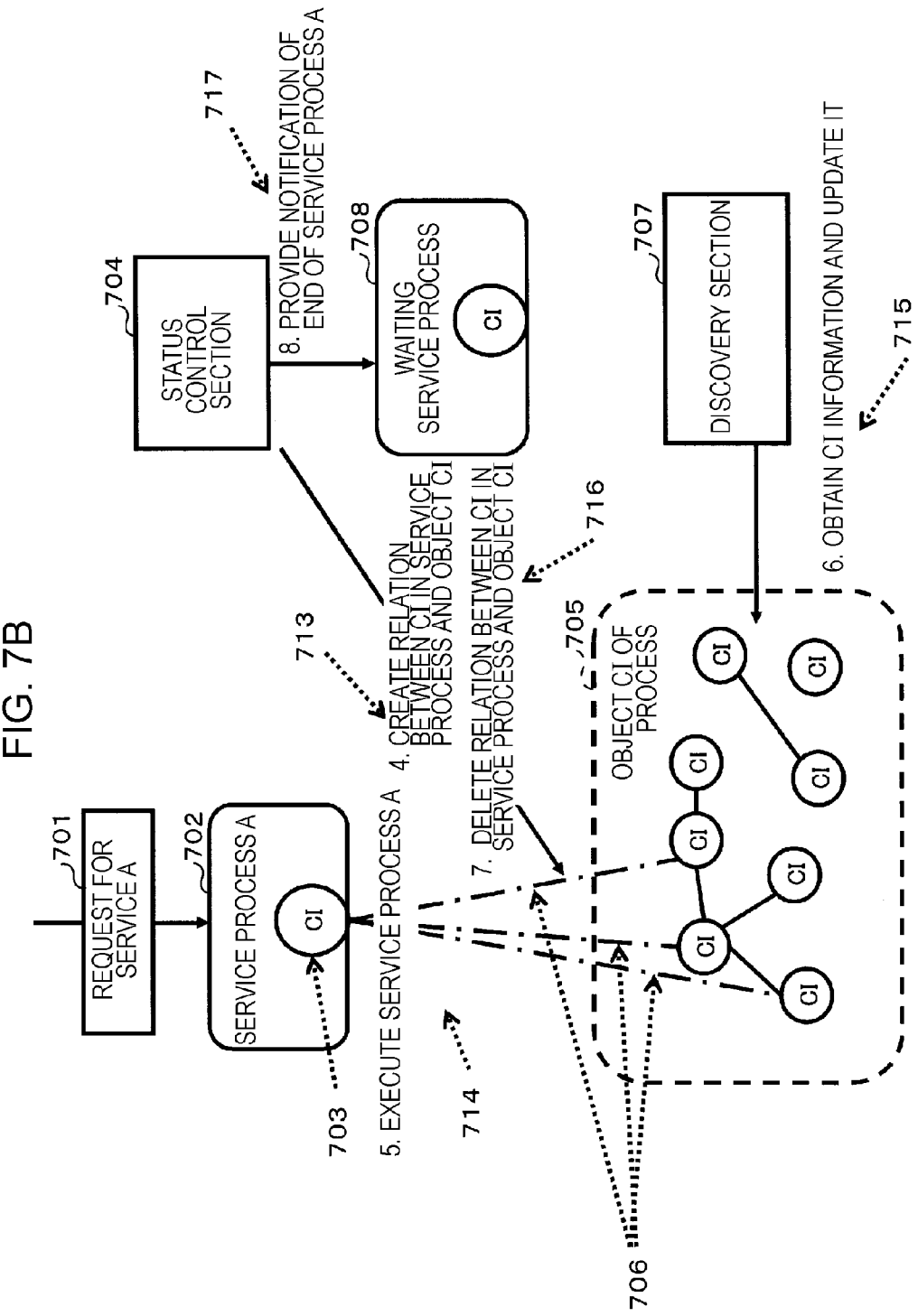
FIG. 7B is a flowchart (2/3) showing processing an action corresponding to a service configuration item in accordance with an embodiment of the invention.

FIGS. 7A to 7C illustrate a method for processing actions corresponding to service configuration items in accordance with embodiments of the invention. In one embodiment, a service process A 702 and another service process being executed may be present as actions for service configuration items. A status control section 704 may hold the object CI attribute 507 of the other service process. The object CI attribute 507 may include the action type for the object CI and the influenced area of the object CI.

In such an embodiment, the administrator of the service process A 702 may issue a request 701 for service process A. Upon receipt 710 of the request 701, a process engine (not shown) may begin service process A 702. At the beginning of service, the process engine may provide 711 an object CI attribute in service process A 702 to the status control section 704. The status control section 704 may then determine whether service process A 702 may be executed from the object CI attribute in service process A 702 and the object CI attribute of the other service process being executed. The status control section 704 may then notify 712A the process engine of the determination. Alternatively, the status control section 704 may provide 712B the object CI attribute of the other service process being executed to the administrator of service process A 702, and the administrator may determine whether service process A 702 may be executed.

FIG. 7B illustrates an exemplary case in which it has been determined that service process A 702 may be executed. In this embodiment, the status control section 704 may create 713 relations between a CI 703 in the service process A 702, and object CIs 705 of service process A 702. After execution 714 of service process A 702, the status control section 704 may require a discovery section 707 to discover information on CIs. The object CIs of the discovery may include all CIs to be managed by the discovery section 707 or may include CIs included in an area in which CIs that are the object of actions for service process A 702 and CIs that are the object of actions for the other service process overlap. The latter case may require less time for discovery. In response to the request, the discovery section 707 may acquire CI information. The attribute-and-relation updating section 104 may then update 715 the attribute values and the relation values of the CI instances according to the acquired CI information.

Notification of completion of the update may be given to the status control section 704. In some embodiments, the attribute-and-relation updating section 104 may give a higher priority to update notification regarding information on object CIs 705 that are related to the CI 703 in service process A 702 than to object CIs 705 that are not related to the CI 703 in service process A 702. The status control section 704 may then delete 716 the relation 706 between the CI 703 in service process A 702 and the object CIs 705.

In one embodiment, another waiting service process 708 may be present. If the status control section 704 has determined whether the waiting service process 708 may be executed, the status control section 704 may determine executability again and notify the process engine of that determination. If the status control section 704 has required the administrator of the waiting service process 708 to determine executability, the status control section 704 may notify 717 the process engine of completion of service process A 702 to enable another determination as to whether an action for the waiting service process 708 may be executed. This notification may allow the administrator of the waiting service process 708 to be informed upon completion of service process A 702. The status control section 704 may further provide CI attribute information to the administrator of the waiting service process 708.

FIG. 7C illustrates an exemplary case wherein it has been determined that service process A 702 may be kept waiting. Upon completion of the preceding other service process 708, the status control section 704, when making the administrator of the service process A 702 determine the executability, may notify 720 the process engine (not shown) upon completion of the preceding other service process 708. This notification may allow the administrator of service process A 702 to be informed of completion of the other service process 708.

The status control section 704 may again determine whether service process A 702 can be executed, using the updated object CI attribute of the other service process 708. If other waiting service processes are present in addition to waiting service process A 702, the status control section 704 may determine 721 executability in order of decreasing waiting time. Alternatively, the status control section 704 may provide the object CI attribute to the administrator of service process A 702 so that the process engine can have the administrator of the service process A 702 determine executability.

If the determination is to keep service process A 702 waiting, the process engine may carry out the waiting process. The status control section 704 may wait for completion of the service process being executed, as described above with reference to FIG. 7B). If it is determined that service process A 702 may be executed, the status control section 704 may create 722 relations 706 between the CI 703 in service process A 702 and the object CIs 705 of service process A 702. The process engine may then execute 723 service process A 702. Upon completion of execution of service process A 702, the status control section 704 may request the discovery section 707 to discover information regarding CIs, as previously discussed. In response to the request, the discovery section 707 may acquire 724 information on the CIs. The attribute-and-relation updating section 104 may then update 724 the attribute values or the relation values of the CI instances according to the acquired CI information.

Notification of update completion may be given to the status control section 704. The attribute-and-relation updating section 104 may give a higher priority to notification of update information regarding object CIs 705 related to the CI 703 in service process A 702 than to object CIs 705 that are not related to the CI 703 in service process A.

Furthermore, the attribute-and-relation updating section 104 may give a higher priority to notification of update information on object CIs 705 that are related to the CI 703 in service process A 702 and included in the area influenced by the other service process 708 waiting than to other object CIs 705.

The information on object CIs 705 related to the CI 703 in service process A 702 and included in the area influenced by the other service process 708 waiting may be set for the request by the status control section 704. In response, the discovery section 707 may acquire the information on the CIs in the influenced area. The status control section 704 may then delete 725 the relation 706 between the CI 703 in the service process A 702 and the object CIs 705.

In some embodiments, the status control section 704 may determine whether the waiting service process 708 may be executed. The status control section 704 may again determine executability and notify the process engine of the determination. In other embodiments, the administrator of the waiting service process 708 may determine executability. The status control section 704 may notify 726 the process engine of completion of service process A 702 to allow another determination as to whether an action for the waiting service process 708 may be executed. This notification may allow the administrator of the waiting service process 708 to be informed upon completion of service process A 702. The status control section 704 may further provide CI attribute information to the administrator of the waiting service process 708.

FIG. 8 shows an example of software change and release management in accordance with embodiments of the invention. In one embodiment, a first operating system ("OS 1") 811 may be running on hardware ("Hardware 1") 810. A relational database management system ("RDBMS") 812 may be running on the OS 1 811. A first database ("Database 1") 813 and a second database ("Database 2") 814 may be running on the RDBMS 812.

A second operating system ("OS 2") 816 may be running on hardware ("Hardware 2") 815. A J2EE 817 may be running on the OS 2 816. The J2EE 817 may be a group of programs that provide a Java® processing environment. A first application ("Application 1") 818 and a second application (Application 2") 819 may be running on the J2EE 817. The Hardware 1 810, the OS 1 811, the RDBMS 812, the Database 1 813, the Database 2 814, the Hardware 2 815, the OS 2 816, the J2EE 817, the Application 1 818, and the Application 2 819 may be stored in a CMDB as CI instances.

The relation between a CI that designates Hardware 1 810 and a CI that designates OS 1 811 may be "runsOn". This may indicate that OS 1 811 is running on Hardware 1 810. Likewise, the relation between the CI that designates OS 1 811 and a CI that designates the RDBMS 812 may be "runsOn". This may indicate that the RDBMS 812 is running on OS 1 811. The relation between the CI that designates the RDBMS 812 and a CI that designates Database 1 813 may be "runsOn". This may indicate that Database 1 813 is running on the RDBMS 812. The relation between the CI that designates the RDBMS 812 and a CI that designates Database 2 814 may be "runsOn". This may indicate that Database 2 814 is running on the RDBMS 812. The relation between the CI that designates Hardware 2 815 and a CI that designates OS 2 816 may be "runsOn". This may indicate that OS 2 816 is running on Hardware 2 815. The relation between the CI that designates OS 2 816 and a CI that designates J2EE 817 may be "runsOn". This may indicate that the J2EE 817 is running on OS 2 816. The relation between the CI that designates J2EE 817 and a CI that designates Application 1 818 may be "runsOn". This may indicate that Application 1 818 is running on J2EE 817. The relation between the CI that designates J2EE 817 and a CI that designates Application 2 819 may be "runsOn". This may indicate that Application 2 819 is running on J2EE 817. The relation between the CI that designates Application 1 818 and a CI that designates Database 2 814 may be "use". This may indicate that Application 1 818 is using Database 2 814.

In some embodiments, service process A 801 may be a process that corrects OS 1 811. The CMDB may store the CI of service process A 801 itself. An object CI attribute 802 may be defined for the CI instance of service process A 801. The object CI attribute 802 may be defined such that the action type is "change" and "influenced area" is "object running on OS 1 (runsOn)" and "object using CI on applicable OS (use)." The applicable OS may be OS 1 811.

Service process B 803 may be a process of changing the parameter of J2EE. The CMDB may store the CI of service process B 803 itself. An object CI attribute 804 may be defined for the CI instance of service process B 803. The object CI attribute 804 may be defined such that the action type is "change" and "influenced area" is "object running on J2EE (runsOn)" and "object using CI on applicable OS (use)." In this case, the applicable OS may be OS 2 816.

In some embodiments, service process B 803, or the process of changing the parameter of J2EE, may be executed during execution of service process A 801, or the process of correcting OS 1 811. The executability determination policy of a status control section 805 may be such that a following service process is kept waiting when the action type of a preceding service process is "change" and the action type of the following service process is "change."

At the beginning of service process A 801, a process engine may notify 820 the status control section 805 that OS 1 811 may be collected in service process A 801. The status control section 805 may notify 821 the process engine that service process A 801 may be executed, since OS 1 811 and CIs related to OS 1 811 are not used by other service processes.

The status control section 805 may create a relation between the CI of service process A 801 and the CI that designates OS 1 811. Furthermore, the status control section 805 may create relations between CIs in the influenced area defined for the CI of service process A 801 and the CI of service process A 801 itself. In this example, the influenced area may be "object running on OS 1 (runsOn)" and "object using CI on applicable OS (use)." Therefore the CI of service process A 801 itself may create 822 a relation with the CI that designates the RDMBS 812 running on OS 1 811, the CI that designates Database 1 813, the CI that designates Database 2 814, and the CI that designates Application 1 818 that is using the CI on OS 1 811.

At the beginning of service process B 803, the process engine may notify 823 the status control section 805 that the J2EE is to be changed in parameter in service process B 803.

Here, the CI that designates Application 1 818 that is influenced by the service process B 803 may be used by service process A 801. Under the policy of the status control section 805A, a CI that is the object of a service process whose action type is "change" may not be changed at the same time. Therefore, the status control section 805 may notify the process engine that the service process B 803 cannot be executed. Here, the status control section 805 may require 824 the administrator of service process B 803 to determine whether service process B 803 may be executed.

Upon completion of service process A 801, the status control section 805 may request a discovery section 806, for example, to discover CIs in the influenced area and acquire information regarding such CIs. When a waiting service process is present, the status control section 805 may request to acquire information on CIs 811, 812, 813, 814, and 818 related to the CI of service process A 801 on a priority basis. Furthermore, the status control section 805 may request to acquire 825 information on the higher priority CI that designates Application 1 818 and is the cause of keeping the service process waiting.

Upon completion of discovery, the status control section 805 may delete 826 the relations between service process A 801 and the CIs. The status control section 805 may then notify 827 the process engine that the process may be executable.

Figure 9:
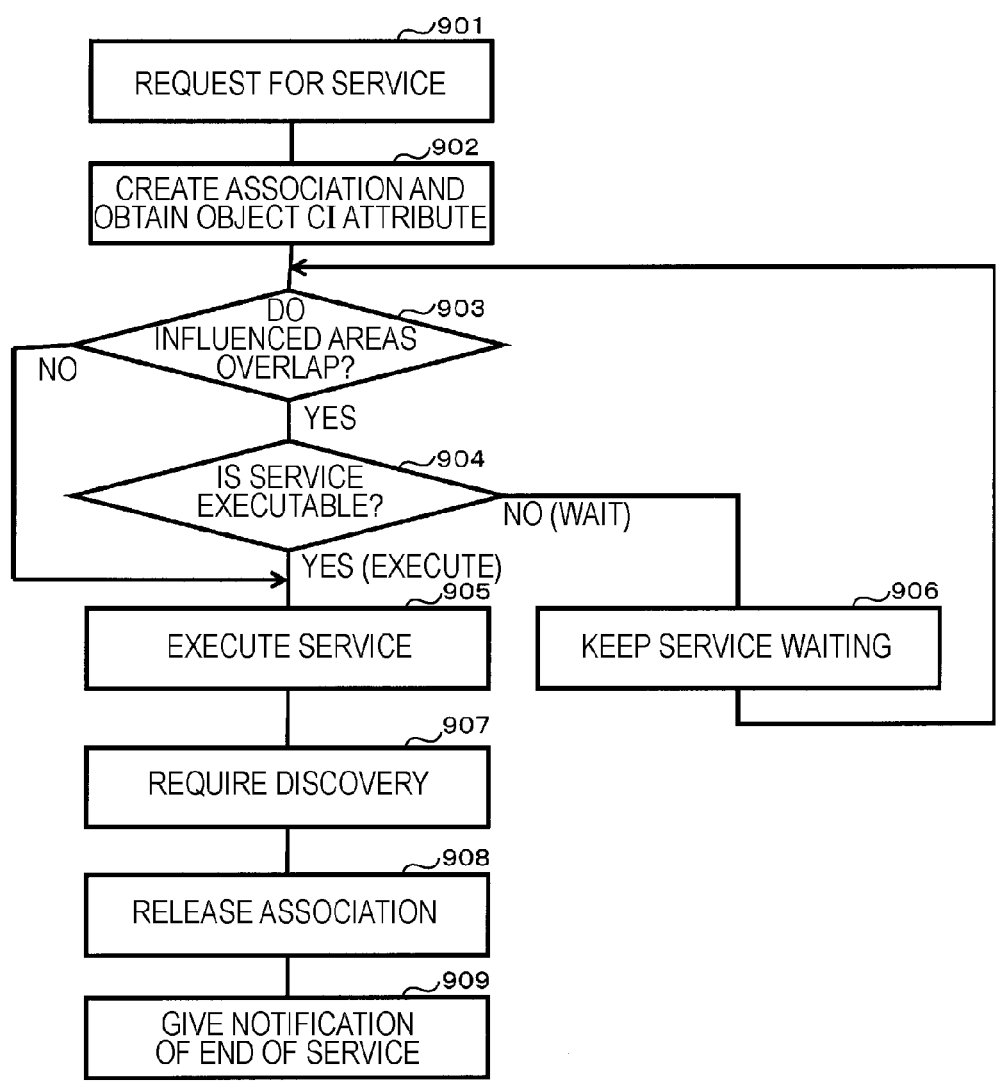
FIG. 9 is a flowchart of a process in accordance with an embodiment of the invention.

FIG. 9 illustrates a process in accordance with certain embodiments of the invention. Specifically, in some embodiments, the administrator of actions for individual service configuration items may issue 901 a request for executing a service to a process engine. In response, a status control section may acquire an action type and an influenced area from a CMDB. Alternatively, the process engine may request the administrator of the service process to input an action type and an influenced area, and may pass the input action type and influenced area to the status control section.

The status control section may acquire the action type and the influenced area input by the administrator from the process engine. The status control section may create relations between the service configuration item and configuration items that are the objects of the action of the service. Furthermore, the status control section may create 902 relations between the service configuration item and configuration items in the influenced area according to the influenced area.

The status control section may determine 903 whether the acquired influenced area and the influenced area set for the action configuration items corresponding to a service being executed overlap. If so, the status control section may determine 904 whether the service can be executed from the acquired action type and influenced area, and the action type and influenced area set for the action configuration items corresponding to the service being executed. An executability determination policy defined in the status control section may be used to make the determination. Alternatively, the status control section may provide the action type and the influenced area set for the action configuration items corresponding to the service being executed to the administrator of the service and may leave the determination to the administrator.

If it is determined that the service may be executed, (such as when the influenced areas do not overlap), the process engine may execute 905 the service. Upon execution, the service configuration item and configuration items related to the service configuration item may be associated.

If it is determined that the service cannot be executed, the process engine may keep 906 the service waiting. The service may be kept waiting until the service being executed is completed. After completion of the service being executed, the status control section may return to step 903.

After completion of the service, the status control section may request 907 the discovery section to execute discovery. In response, the discovery section may acquire information on CIs in the influenced area or requested CIs. Next, an attribute-and-relation updating section may update the attribute values or the relation values of the CI instances on the basis of the acquired CI information. The attribute-and-relation updating section may notify the status control section upon update completion.

In response to the notification, the status control section may release 908 the relation between the service configuration item and the related configuration items. In some embodiments, the status control section may notify 909 the process engine that the service has finished if a waiting service is present.

FIG. 10 shows an example of a computer system in accordance with embodiments of the invention. Like the computer system 100 shown in FIG. 1A, a computer system 1000 may include a discovery section 1001, a CI-identifying section 1002, a CI-instance creating section 1003, an attribute-and-relation updating section 1004, and a CMDB 1005. The computer system 1000 may further include a discovery table 1006, a model table 1007, and a relation table 1008.

A status control section 1009 may include an associating section 1011, a determining section 1012, and a presenting section 1013. The associating section 1011 may associate a service configuration item to one or more configuration items that are the objects of an action for the service configuration item.

When a request for an action corresponding to a second service configuration item is given during execution of an action corresponding to a first service configuration item, and at least one configuration item that is the object of the action for the first service configuration item is included in a configuration item that is the object of the action for the second service configuration item, the determining section 1012 may determine whether execution of the action for the second service configuration item may be allowed. The determining section 1012 may also determine, according to a policy that defines rules for determining whether execution of an action for a service configuration item may be allowed, whether execution of an action for a service configuration item may be allowed.

The presenting section 1013 may present on a display section an interface. The interface may allow the user to determine whether to execute an action for a service configuration item. A process engine 1010 may execute service processes or service steps. The process engine 1010 may define parameters for pointing CIs that are the objects of service processes in the individual service processes. The status control section 1009 and/or the process engine 1010 may be included in the computer system 1000 or, alternatively, may be included in a computer system (not shown) connected to the computer system 1000 with a cable.

A computer included in a computer system in accordance with embodiments of the invention may include a CPU and a main memory, which are connected to a bus. In some embodiments, the CPU may be based on a 32-bit or 64-bit architecture which may use, for example, Xeon® series, Core® series, Pentium® series, Celeron® series, Phenom® series or Athlon® series processors. The bus may be connected to a display, such as an LCD monitor, via a display controller. The display may be used to display information on a computer connected to a network over a communication line, and information on software running on the computer, with an appropriate graphical interface. The bus may also be connected to a hard disk or a silicon disk, and to a CD-ROM, DVD, or a Blu-ray drive via an IDE or SATA controller.

The hard disk may store an operating system, a program for providing a Java® processing environment such as J2EE, a CMDB operation managing program and other programs, and data such that they can be loaded in the main memory. The operation management program may include, for example, Tivoli® Application Dependency Discovery Manager ("TADDM") available from International Business Machines Corporation.

The CD-ROM, DVD, or BD drive may be used to add a program from a CD-ROM, DVD-ROM, or BD to a hard disk, as required. The bus may also be connected to a keyboard and a mouse via a keyboard and mouse controller.

The communication interface may comply with, for example, the Ethernet® protocol. The communication interface may be connected to a bus via a communication controller to physically connect the computer and the communication line. The communication controller may further provide a network interface layer to the TCP/IP protocol of the communication function of the operating system of the computer. The communication line may adopt a cable LAN environment or a wireless LAN environment based on a wireless LAN connection standard, such as IEEE802.11a/b/g/n.

Examples of a network connection device used for connecting computers or other hardware may include, in addition to the foregoing network switch, a router and a hardware management console. In other words, the network connection devices may return configuration information, such as an IP address and a MAC address, of a computer connected to another computer. In some embodiments, the computer may install a network operation management program in response to an inquiry using a predetermined command from the other computer.

The network switch and the router may include an address resolution protocol ("ARP") table including a list of address pairs. Each address pair may consist of the IP address of a computer connected thereto and a corresponding MAC address, and may return the content of the ARP table in response to an inquiry using a predetermined command. The hardware management console may return more detailed configuration information on a computer than the ARP table.

In some embodiments, the above-described hardware management console may be connected to the computer. The hardware management console may logically partition one computer into multiple partitions by LPAR and by running different OSs, such as Windows® and Linux®, in each partition by VMware®. This may allow acquisition of detailed information regarding the individual logical partitions of the computer operating on LPAR/VMware® by systematic inquiry from the hardware management console.

While the invention has been described with reference to certain embodiments, it will be understood by those skilled in the art that the descriptions of the embodiments are merely examples of the invention and that various modifications may be made without departing from the technical scope of the invention. For example, the invention may use not only the CMDB and CIs stored therein but also another form of database and CIs. Likewise, the invention may use, in addition to Java®, any computer development environment, such as C++ and C#, which may invoke an API having a network management function.

The invention claimed is:

1. A system for managing execution of an action for a service configuration item, the system comprising:
    a model table;
    a relation table;
    a discovery section discovering information regarding a configuration item;
    a repository storing, for each configuration item, a set of data indicating at least one predetermined attribute of the configuration item and a relation between the configuration item and other configuration items;
    an associating section associating a service configuration item with at least one other configuration item, the other configuration item being an object of an action for the service configuration item; and
    a determining section determining, in the event a request for an action for a second configuration item is issued during execution of an action for a first service configuration item, and a configuration item that is an object of the action for the second service configuration item is an object of the action for the first service configuration item, whether execution of the action for the second service configuration item is allowed, where the configuration item that is the object of the action for the second service configuration item and the object of the action for the first service configuration item is included in an area of overlapping object configuration items for the first and second service configuration items.

2. The system of claim 1, wherein the discovery section discovers information regarding a configuration item after completion of at least one of the action associated with the first service configuration item and the action associated with the second service configuration item.

3. The system of claim 2, wherein the configuration item is the object of the action associated with the completed service configuration item.

4. The system of claim 1, wherein the service configuration item comprises at least one of a service process and a service step included in a service process.

5. The system of claim 1, wherein the determining section determines whether execution of the action associated with the second service configuration item is allowed according to a policy that defines determination rules for actions associated with service configuration items.

6. The system of claim 1, further comprising a presenting section for presenting an interface that enables a user to determine whether execution of the action is allowed.

7. The system of claim 1, wherein, if execution of the action associated with the second service configuration item is allowed, the determining section allows the action associated with the second service configuration item to be executed, whereas if execution of the action associated with the second service configuration item is not allowed, the determining section keeps execution of the action associated with the second service configuration item waiting.

8. The system of claim 7, wherein, if execution of the action associated with the second service configuration item is kept waiting, the determining section further determines whether execution of the action associated with the second service configuration item is allowed in response to completion of the action associated with the first service configuration item.

9. The system of claim 1, wherein if a configuration item that is the object of the action associated with the first service configuration item does not overlap with a configuration item that is the object of the action associated with the second service configuration item, the determining section allows execution of the action associated with the second service configuration item.

10. The system of claim 1, wherein associating a service configuration item with at least one other configuration item comprises associating the service configuration item upon beginning execution of the action associated with the first service configuration item.

11. The system of claim 10, wherein the associating section ceases associating the service configuration item with the at least one other configuration item upon completion of the action associated with the first service configuration item.

12. The system of claim 1, wherein a data model defining a predetermined attribute and a relation between a configuration item and other configuration items comprises an action type of a service configuration item and an area of a configuration item that is the object of an action associated with the service configuration item.

13. A method for managing execution of an action for a service configuration item, the method comprising:
   discovering information, by a discovery section of a system comprising a model table and a relation table, regarding a configuration item;
   creating, for each configuration item, a set of data comprising at least one predetermined attribute of the configuration item and a relation between the configuration item and other configuration items;
   storing, by a processor, the set of data in a repository;
   associating a service configuration item with at least one other configuration item; and
   determining, in the event a request for an action for a second configuration item is issued during execution of an action for a first service configuration item, and a configuration item that is an object of an action for the second service configuration item is an object of the action for the first service configuration item, whether execution of the action for the second service configuration item is allowed, where the configuration item that is the object of the action for the second service configuration item and the object of the action for the first service configuration item is included in an area of overlapping object configuration items for the first and second service configuration items.

14. The method of claim 13, further comprising discovering information regarding a configuration item after completion of at least one of the action associated with the first service configuration item and the action associated with the second service configuration item.

15. The method of claim 14, further comprising, after completion of at least one of the action associated with the first service configuration item and the action associated with the second service configuration item, discovering information regarding a configuration item that is the object of the action associated with the completed service configuration item.

16. The method of claim 13, wherein determining whether execution of the action is allowed further comprises using a policy that defines rules for determining whether execution of an action associated with a service configuration item is allowed to determine whether execution of the action is allowed.

17. The method of claim 13, further comprising allowing the action associated with the second service configuration item to be executed if execution of the action is allowed, and keeping execution of the action associated with the second service configuration item waiting if execution of the action is not allowed.

18. A computer program product for managing execution of an action for a service configuration item, the computer program product comprising:
   a non-transitory computer-readable storage medium having computer-usable program code embodied therein, the computer-usable program code comprising:
      computer-usable program code for discovering information, by a discovery section of a system comprising a model table and a relation table, regarding a configuration item;
      computer-usable program code for creating, for each configuration item, a set of data comprising at least one predetermined attribute of the configuration item and a relation between the configuration item and other configuration items;
      computer-usable program code for storing the set of data in a repository;
      computer-usable program code for associating a service configuration item with at least one other configuration item, the other configuration item being an object of an action for the service configuration item; and
      computer-usable program code for determining, in the event a request for an action for a second configuration item is issued during execution of an action for a first service configuration item, and a configuration item that is an object of an action for the second service configuration item is an object of the action for the first service configuration item, whether execution of the action for the second service configuration item is allowed, where the configuration item that is the object of the action for the second service configuration item and the object of the action for the first service configuration item is included in an area of overlapping object configuration items for the first and second service configuration items.

* * * * *